(12) United States Patent
Woodruff et al.

(10) Patent No.: US 6,851,634 B2
(45) Date of Patent: Feb. 8, 2005

(54) GRANULAR SPREADER AND PRODUCT CONTAINER

(75) Inventors: Keith F. Woodruff, Mountainside, NJ (US); John H. Thomas, East Windsor, NJ (US)

(73) Assignee: BASF Akteingesellschaft, Ludwigshafen (DE)

( * ) Notice: Subject to any disclaimer, the term of this patent is extended or adjusted under 35 U.S.C. 154(b) by 0 days.

(21) Appl. No.: 10/430,080

(22) Filed: May 6, 2003

(65) Prior Publication Data

US 2003/0197077 A1 Oct. 23, 2003

Related U.S. Application Data

(60) Division of application No. 09/887,461, filed on Jun. 22, 2001, now Pat. No. 6,588,685, which is a division of application No. 09/440,603, filed on Nov. 15, 1999, now Pat. No. 6,499,679, which is a continuation-in-part of application No. 09/189,555, filed on Nov. 11, 1998, now abandoned.
(60) Provisional application No. 60/067,464, filed on Dec. 4, 1997.

(51) Int. Cl.[7] ............................................... A01C 15/00
(52) U.S. Cl. ..................... 239/650; 239/651; 239/668; 239/302; 239/319; 239/327; 239/328; 239/681; 239/685
(58) Field of Search ................................ 239/650, 651, 239/668, 665, 666, 669, 676, 681, 685, 689, 302, 319, 327, 328; 222/95, 105, 386.5, 613, 614, 623, 625, 624

(56) References Cited

U.S. PATENT DOCUMENTS 350,821 A * 10/1886 Field .......................... 239/665
1,166,477 A * 1/1916 Parrish ....................... 239/665
3,216,620 A * 11/1965 Laughlin ....................... 222/83
3,239,107 A * 3/1966 West et al.
3,523,648 A * 8/1970 Garber ........................ 239/668
4,185,782 A * 1/1980 Belrose ....................... 239/663
4,541,765 A * 9/1985 Moore ......................... 414/267
5,294,060 A * 3/1994 Thompson ................... 239/656

* cited by examiner

Primary Examiner—Robin O. Evans
(74) Attorney, Agent, or Firm—Mark P. Stone

(57) ABSTRACT

Methods and apparatus are provided for dispensing chemical material, and in particular, granular, agricultural material, from a moving device driven over terrain to be treated with the material. A metering system for dispersing the material includes on apertured metering disk positioned above a rotatable impeller. The apertured disk meters material from a product container, by gravity feed, onto the impeller below at a rate proportional to the linear speed at which the apparatus is driven to dispense material at a uniform density over the terrain. The metering disk is a component of a product container which is removably mounted to the device. The impeller rotates at a constant speed to disperse the deposited material at a uniform distance from the apparatus, and the position on which the material is deposited on the impeller is adjustable. A clutch permits the user to discontinue dispensing material from the device at the selection of the user, and automatically discontinues dispensing of material when the apparatus is driven in a reverse direction. Switches are provided for selectively adjusting the speed of rotation of the impeller, and the pattern at which material is propelled from the impeller. An override clutch permits the impeller to rotate after movement of the apparatus ceases, and a clutch housing is provided to reduce noise during operation of the apparatus.

27 Claims, 23 Drawing Sheets

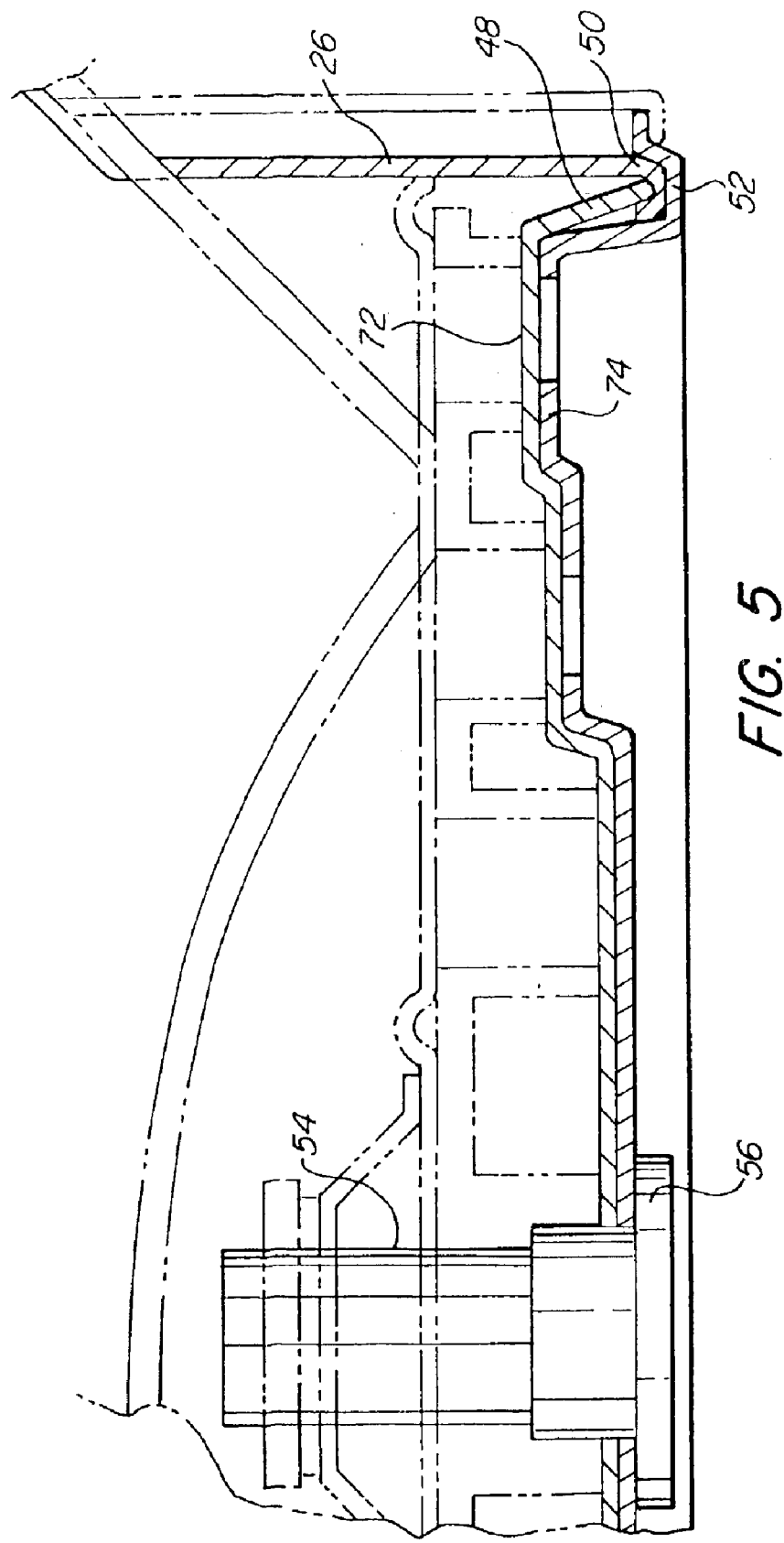

DRIVE DIRECTION

GRANULAR SPREADER AND PRODUCT CONTAINER

This application is a divisional of Ser. No. 09/887,461, filed Jun. 22, 2001 (now U.S. Pat. No. 6,588,685), which is a divisional of Ser. No. 09/440,603, filed Nov. 15, 1999 (now U.S. Pat. No. 6,499,679), issued Dec. 31, 2002, which is a continuation-in-part of Ser. No. 09/189,555, filed Nov. 11, 1998 (now abandoned), which claims the benefit of provisional application Ser. No. 60/067,464, filed Dec. 4, 1997.

BACKGROUND OF THE INVENTION

The present invention is directed to methods and apparatus for dispersing material, particularly granular chemical material. The invention is particularly adapted for dispensing agricultural treatment material, such as pesticides, herbicides, fungicides, and fertilizer from an apparatus driven over the terrain onto which the treatment materials are to be applied.

Agricultural dispensing apparatus, more commonly known as granular spreaders, generally include a wheeled vehicle, either self-powered (e.g., motorized) or manually driven, including a housing having a hopper for receiving a container holding the product to be dispersed, and metering means for controlling the quantity of material flowing from the product container, by gravity feed, and onto dispersing means, such as a rotating plate, positioned beneath the metering means for receiving material deposited thereon. The apparatus is driven along terrain to be treated, and the material to be applied to the terrain is dispersed from the moving apparatus by the rotational forces applied by the rotating plate.

Known agricultural spreaders exhibit disadvantages which include: variations in the rotational speed of the dispersing plate (and thereby variations in the distance which material is propelled from the spreader) in proportion to changes in the linear speed of the spreader; imprecise metering of material deposited on the disperser plate from the product container during repeated dispersing operations; the inability to control the angular orientation at which material is dispersed from the spreader; and the inability to automatically disengage the metering means from the disperser plate to prevent material from being deposited on the disperser plate when the spreader is moved in a reverse direction.

It is the primary object of the present invention to provide an improved spreader, particularly for dispensing granular agricultural materials onto terrain over which the spreader is driven, which overcomes the aforementioned disadvantages, and others, encountered in the operation of known dispersing apparatus. Other objects and advantages of the methods and apparatus in accordance with the present invention will become apparent from the following description of the invention in conjunction with the drawings.

SUMMARY OF THE INVENTION

The present invention provides methods and apparatus for dispensing material, and in particular granular agricultural treatment material, from a moving disperser device. The device includes a housing, at least a pair of wheels mounted to the housing for driving the housing over the ground, and a handle by which the device can be driven. The vehicle may be either self-powered or manually driven, and includes a housing having a hopper for removably receiving a product container with the material to be dispersed. Metering means are provided to control the flow of material, by gravity feed, from the hopper and onto a spinning impeller therebelow for propelling the material from the moving apparatus. The metering means includes an apertured disk defining a plurality of concentric rows of vertical channels, each of the vertical channels having opened upper and lower ends. A discharge plate defining at least one opening thereon is mounted below the metering disk, and is operatively associated with the metering disk such that rotational movement of the metering disk relative to the discharge plate selectively covers and uncovers the openings in the lower ends of selected vertical channels in the metering disk. When the lower openings of the channels are uncovered, material in the channels is permitted to flow through the opening in the discharge plate, by gravity feed, to be deposited onto a rotatable impeller therebelow. A charging plate having at least one opening is mounted above the top of the metering disk such that rotational movement of the metering disk relative to the charging plate uncovers the upper ends of selected vertical channels in the metering disk. In this relative position, material from the hopper flows, by gravity feed, through the opened portion of the charging plate to fill each of the selected uncovered vertical channels in the metering disk to its maximum volume. During the filling procedure, the discharge plate beneath the metering disk covers the lower ends of the vertical channels being filled to prevent the material from dropping through the channels. When the channels are filled to full capacity, the metering disk is rotated such that the charging plate covers the top openings in each filled vertical channel to sweep excess material therefrom and to prevent further material from being deposited therein. The discharge plate beneath the metering disk is oriented relative to the charging plate so that when the metering disk rotates relative to the charging plate to cover the upper ends of the filled channels, the metering disk simultaneously rotates relative to the discharge plate to uncover the lower ends of the vertical channels to permit the material in the filled channels to drop downwardly, by gravity feed, onto the rotatable dispersing impeller therebelow. In this manner, a uniform, repeatable quantity of material, corresponding to the volume of the filled vertical channels defined in the metering plate, is sequentially deposited on the dispersing impeller during each filling and metering operation. A drive train couples the metering disk to a wheel of the spreader for imparting rotational movement to the metering disk so that material is metered at a rate corresponding to the linear speed of the spreader and is dispensed in uniform density over the terrain travelled by the spreader.

A selector plate is mounted beneath the discharge plate (which itself is mounted beneath the metering disk) for selectively blocking the lower openings of predetermined vertical channels in the metering disk for controlling the position on which material is deposited from the metering disk onto the rotatable impeller therebelow. The position at which material is deposited on the impeller is a parameter which affects the range or distance that the material deposited thereon is propelled as a result of applied rotational forces. The selector plate maintains the openings in the lower ends of predetermined vertical channels covered without regard to the position of the metering disk relative to the discharge plate, thereby effectively overriding the discharge plate when metering disk is rotated over an opened portion of the discharge plate to uncover the lower openings in the predetermined vertical channels. The selector plate also provides means for selectively blocking different overall sections of the metering disk to adjust the angular orientation at which material is propelled from the moving spreader by the rotatable impeller.

At least one wheel of the spreader is coupled to the impeller to impart rotational movement to the impeller as the spreader is driven over the terrain to be treated, and means are provided for maintaining the actual rotational speed of the rotatable disperser impeller constant and independent of the linear speed of the spreader. In this manner, the distance or range which material deposited on the rotating impeller is propelled, which is proportional to the rotational speed of the impeller, is maintained at a constant value which is selectively adjustable by adjusting the rotational speed of the impeller. In the preferred embodiments of the invention, the means for maintaining the rotational speed of the impeller at a constant value includes a plurality of weights which are movable in guide elements, by inertial forces, relative to the center of the impeller for opposing applied forces to the impeller tending to increase or decrease the rotational speed thereof.

The spreader, in its preferred embodiments, includes a clutch system and associated drive train coupled to one wheel of the spreader for automatically disengaging the meter assembly to prevent material from being deposited on the rotatable impeller when the spreader is moved in a predetermined direction (i.e., in reverse).

The present invention also provides an improved product container for removably mounting onto the hopper of the spreader. The lower portion of the container defines a compartment for accommodating a meter housing including the meter assembly discussed above. In the preferred embodiments of the invention, the container includes a transparent plastic product bag received within a container housing, and a clear section on the container housing to permit visual observation of the contents within the product bag. Because the meter housing and the removable product container are formed as a single unit which is removably mounted to the spreader, the meter assembly can be pre-set to the desired quantity of material to be metered, the desired rate at which material is to be metered, and the desired position at which material is to be deposited on the dispersing impeller, before the product container is mounted to the spreader.

In a further embodiment of the spreader apparatus and product container in accordance the present invention, the spreader includes override clutch means which permit a rotatable impeller to continue to rotate after movement of the apparatus has ceased for dispersing any material remaining on the impeller after the spreader has come to a halt. In this manner, excess residual product deposited on the impeller will not be dispersed from the impeller when the spreader apparatus resumes travel along the terrain to be treated and the impeller resumes rotation.

The spreader apparatus also includes a selector switch readily accessible to an operator for selectively adjusting the rotational speed of the impeller between two or more different pre-selected speeds for adjusting the distance or range which material is propelled from the rotating impeller. An on/off switch for disengaging a drive train coupling the wheels of the spreader to the impeller is operatively associated with the selector switch to assure that the rotational speed of the impeller can not be changed unless the drive train to the impeller is disengaged.

The spreader apparatus also includes a further switch readily accessible to the operator for controlling the area of terrain relative to the spreader apparatus on which material from the apparatus will be dispersed from the rotatable impeller. This switch enables the operator to selectively control the pattern of distribution of material from the impeller plate in a direction predominantly forward of the apparatus, in a direction predominantly to the left side of the apparatus, in a direction predominantly to the right side of the apparatus, in a direction to the rear of the apparatus, or equally distributed to the left and right sides of the apparatus, as may be required by the specific application being made by the spreader apparatus as it moves along the terrain to be treated. The switch also includes an "off" position in which no material is distributed. Visual indicia provide the operator with illustrations of the specific mode of operation corresponding to each of the different switch positions.

The spreader apparatus also includes means for enabling the operator to readily align and engage drive shafts in a meter assembly carried by a product container and in the spreader apparatus to permit material to be metered from the product container and dispersed by the spreader as the spreader is moved along terrain to be treated. The spreader apparatus also includes guide elements for assuring that the selector plate which controls the distribution pattern of material dispersed from the spreader apparatus is maintained in proper position relative to the metering disk of the spreader apparatus to assure that the proper quantities of material are metered and deposited on the proper positions on the rotatable impeller.

The spreader apparatus also includes beveled edges on a clutch compartment enclosing a clutch forming part of the drive train between the wheels of the spreader and the rotatable impeller. The beveled edges of the clutch compartment enclose the clutch and tend to muffle and deflect sound waves generated by the clutch in a direction towards the inner surface of the spreader wheels to result in quieter operation of the spreader apparatus as it moves along the terrain to be treated.

The spreader apparatus also includes a drive train coupling the wheels of the spreader to the rotatable impeller having a drive belt with evenly spaced sprocket openings which are engaged by drive pins in a capstan to provide a more positive driving force than provided by O-ring belt designs.

The spreader apparatus also includes hinged flaps which are selectively movable between extended and retracted positions, respectively. The flaps are removably retained in either extended or retracted positions by retaining means which include complementary magnets mounted to the spreader apparatus and the flaps. The flaps are mounted to the left and right sides of the spreader apparatus and are provided to prevent product from drifting into undesired areas when an edge application of material is required during a treatment process.

In a further embodiment of a product container in accordance with the present invention, the product container can be formed from a molded plastic material so as to be re-usable during different treatment operations of the spreader apparatus. The container can be designed to include a lower rolling lip structure to be removably received in a flange of a meter assembly for readily connecting and disconnecting the meter assembly from the container. The container and the meter assembly include cooperating structure by which the meter assembly is maintained in a fixed position relative to the container when the meter assembly and container are coupled to each other.

The container also includes a domed or spherical partition mounted proximate to the bottom of the container for preventing the full weight of product in the container from being applied directly to the meter assembly carried by the bottom of the product container. This partition supports the weight of all product in the container positioned thereabove. The partition also includes at least one slot or aperture for controlling the downward flow of material from above the partition and onto the meter assembly positioned below the partition. The partition rotates together with the meter disk and tends to break up lumps of material into smaller granules as the material flows downwardly by gravity feed through the opening in the rotating partition.

BRIEF DESCRIPTION OF THE DRAWINGS

FIG. 5 is an expanded view of the lower right end portion of the container illustrated by FIG. 2 showing, in detail, the manner in which components of the meter assembly are mounted to a meter housing proximate to the bottom end of the product container;

DESCRIPTION OF THE BEST MODES FOR CARRYING OUT THE INVENTION

Figure 1:
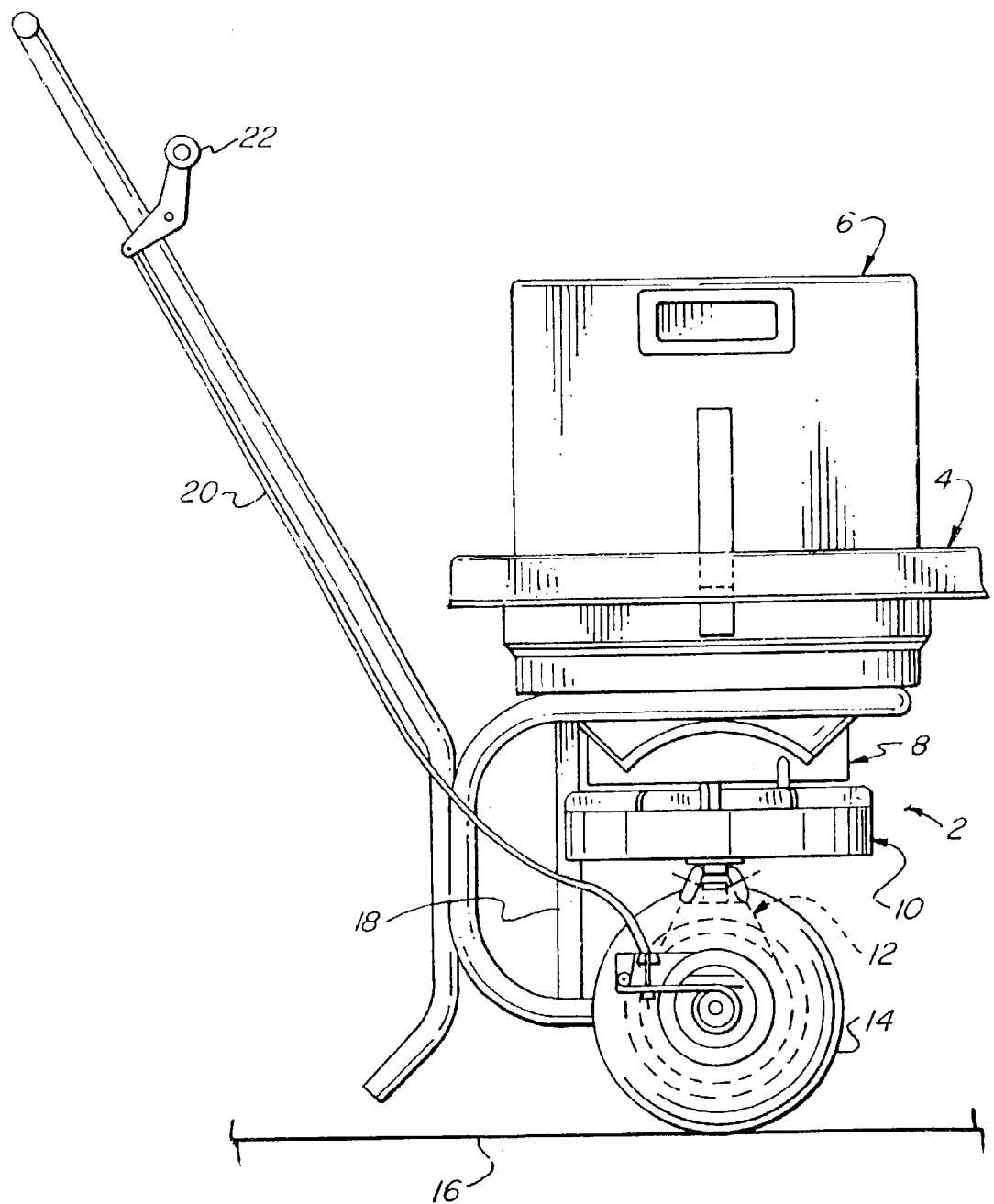
FIG. 1 of the drawings is a side elevational view of a dispensing apparatus in accordance with the present invention, and a product container mounted to the apparatus in accordance with the present invention.

FIG. 1 illustrates an overview of the dispensing apparatus in accordance with the present invention, and in particular, an apparatus for dispersing granular chemical material such as pesticides, and herbicides. The apparatus is driven over terrain to be treated, and the treatment material carried by the apparatus is applied to the terrain. The following discussion refers to the apparatus in accordance with the present invention as a "spreader" or an "agricultural spreader".

The spreader in accordance with the preferred embodiments of the present invention is designated generally by reference numeral 2. The major components of the spreader 2 include a hopper 4 provided for removably receiving a product container 6 holding the material to be dispersed by the spreader. A housing sleeve 8 is provided to receive a metering housing, to be discussed in greater detail below, integrally defined at the bottom of the product container 6. The product container and metering assembly are therefore removably mounted to the hopper of the spreader as a single unit. An impeller assembly 10, including a rotatable impeller, is disposed beneath the housing sleeve 8, and a drive belt 12 operatively associated with a wheel 14 is coupled to the impeller assembly 10 for imparting rotational movement to the impeller, when the wheel 14 rotates as the spreader 2 is driven over the terrain designated by reference numeral 16. (As will be described below, a drive system is also provided to impart rotational movement of the wheel to a metering disk rotatably mounted within the metering housing). A second wheel, mounted on the opposite end of an axle on which the first wheel 14 is mounted, is not shown in FIG. 1. The spreader also includes a vertical supporting element 18 to reinforce the structural integrity of the assembled device, and a handle 20 by which the device is driven by a user. The spreader 2 can be manually driven or self-powered (e.g., motorized). A lever 22 is mounted to the handle to permit the user to disengage the metering system to selectively prevent the application of material to the terrain by the spreader when the switch is in the off position.

Figure 2:
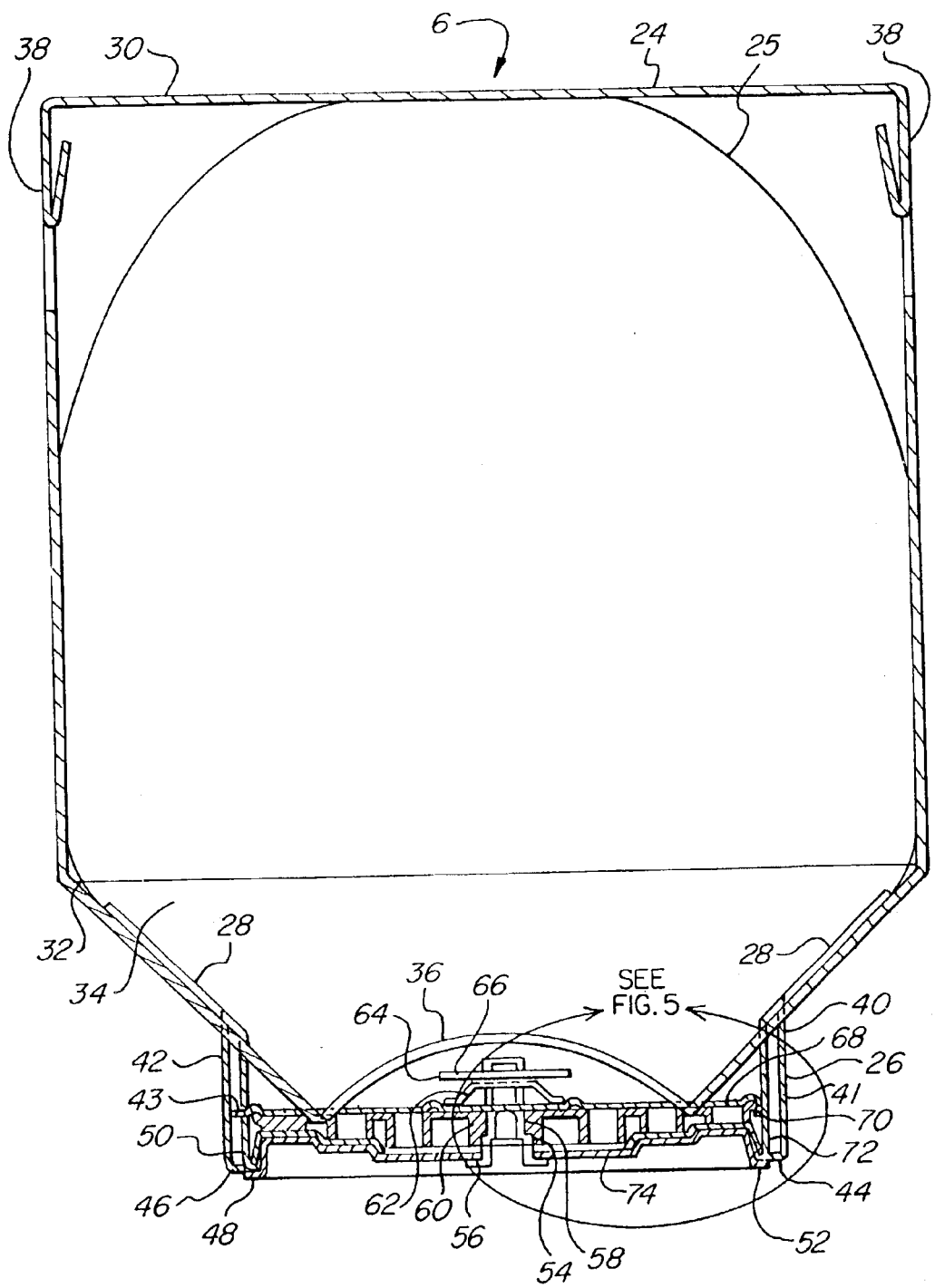
FIG. 2 is a front elevational view, in section, of the product container of FIG. 1 removed from the apparatus.
Figure 3:
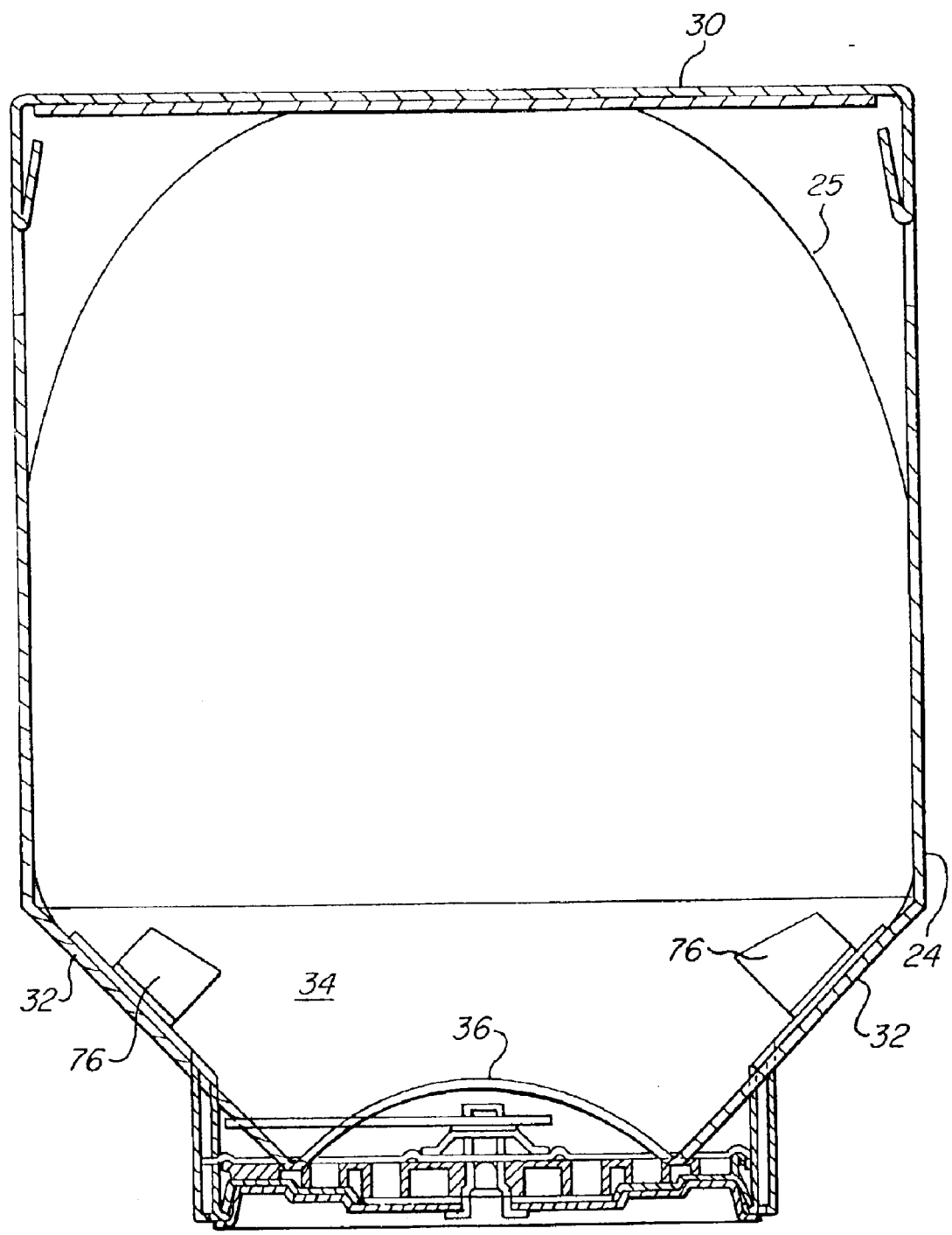
FIG. 3 is a side elevational view, in section, of the product container illustrated by FIG. 2.

FIG. 2 of the drawing illustrates a front elevational view, in section, of the product container 6 shown in FIG. 1, removed from the spreader apparatus. FIG. 3 is a side elevational view of the product container 6 illustrated by FIG. 2. The product container 6 is formed from three major components—a container housing 24 which can be formed from a corrugated cardboard material; a product bag 25 mounted inside the housing 24; and a metering housing 26 integrally formed as a single unit with the product container 6 and mounted to a pyramid shaped flange 28 defined at the bottom of the housing 24. The top end 30 of the housing 24 is formed from a conventional flap-type closure and the bottom end of the housing is formed from tapered edges 32 on flaps 34, and an arcuate section 36 extending over the top of a portion of the meter housing 26. Cut-out sections 38, defined on opposed sides proximate to the top end 30 of the housing 24, provide handles to enable a user to carry the product container 6 when it is removed from the hopper of the spreader.

Reference numerals 40 and 42 designate key shaped cut-out portions defined on a cylindrical part of the meter housing 26 and are provided for locking mating keys 41 and 43 (defined on a charging plate which is a component of the meter assembly, to be discussed below) and mating keys 44 and 46 (defined on a discharge plate which is another component of the meter assembly, to be discussed below). In this manner, the charging plate and discharge plate of the meter assembly are fixedly (non-rotatably) mounted to the metering housing. A rolled lip 50 of the metering housing receives therein a side edge of a component of the metering assembly (a discharge plate, discussed in greater detail below) to prevent components of the metering assembly from dropping through the metering housing, and a flange 52, defined by the side edge of another component of the metering assembly (a selector plate, to be discussed in greater detail below) rides below the outer surface of the rolled lip 50 of the metering housing to prevent the components within the metering housing from being displaced upwardly. Accordingly, the container housing 24 and the meter housing 26 each define cooperating structure for maintaining the metering housing in a fixed position relative to the container housing 24, and for maintaining selected components within the metering housing in a fixed orientation relative to each other. The structure and structural relationship for retaining the metering housing in the product container will be discussed in greater detail with reference to FIG. 5.

Still referring to FIG. 2, a drive bushing 54 joins the metering assembly components within the metering housing through center axis openings with a bushing flange 56, a square drive 58 carried on a drive shaft within the bushing which engages a square hole 60 defined in the center of a metering disk 70. The drive bushing 54 further extends through a compression cup 62 and a thrust washer 64. A retaining pin, designated by reference numeral 66, is provided to maintain the meter assembly in its assembled state within the meter housing.

Still referring to FIG. 2, the meter assembly is defined by a plurality of components contained within the meter housing 26. The components of the meter assembly include a charging plate 68, a metering disk 70 having a top surface disposed beneath the charging plate, a discharge plate 72 disposed beneath a lower surface of the metering disk, and a selector plate 74 disposed beneath the discharge plate. Each of these components contiguously abuts against adjacent components. As will be discussed in greater detail herein, the components of the meter assembly operatively cooperate with each other to, among other things, control the quantity of material discharged from the spreader apparatus, control the range at which material is dispersed from the spreader, and control the angular orientation at which material is dispersed from the spreader. As will also be discussed herein, the meter assembly within the metering housing 26 is driven by the linear movement of the spreader over the terrain to be treated, said movement being transferred to the meter assembly by a drive train of a transmission system coupling a wheel of the spreader to the meter assembly when the product container 6 is mounted in its operating position in the hopper 4 of the spreader 2.

FIG. 3 illustrates a side view of the product container 24 and the product bag 25 shown in FIG. 2. The same reference numerals have been used to designate corresponding components. Reference numeral 76 illustrates strips of retainer tape which are applied to join together the flaps 34 defining the lower, inwardly tapered, end of the product container 24.

Figure 4:
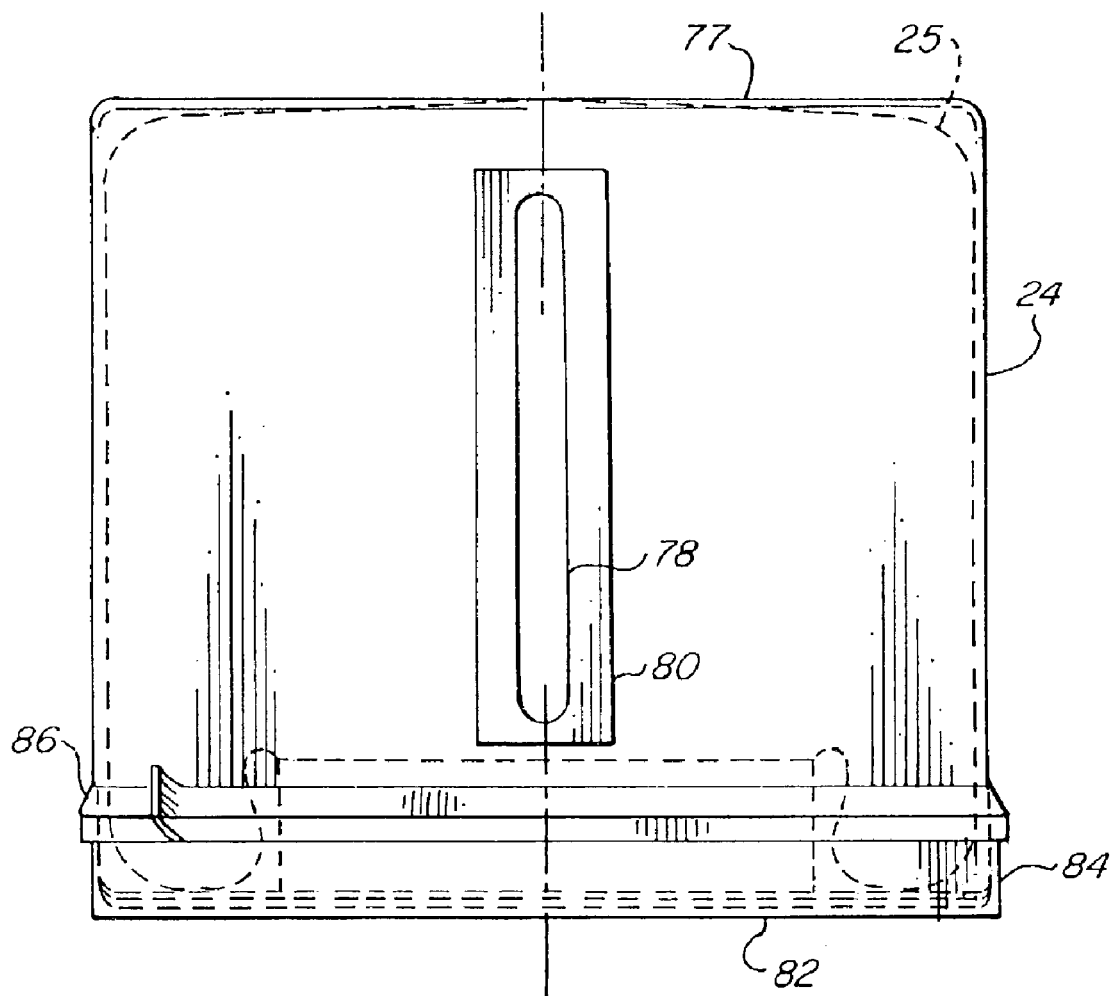
FIG. 4 illustrates a side view of the product container, as illustrated by FIGS. 2 and 3, and a cover sealing the bottom of the container.

FIG. 4 schematically illustrates the product container 24 showing additional features of the invention. An adhesive material is applied between the top of the product bag 25 and the top of the product housing 24 at a location designated by reference numeral 77 to maintain the bag in an extended position relative to the product housing even after material has been discharged from the bag. In this manner, the bag will not drop onto the metering housing at the bottom of the product container and interfere with the continued discharge of product when the upper portion of the product bag has become emptied as a result of the discharge of product therefrom by gravity feed. A longitudinally extending slot 78 is defined on one side of the housing 24, and the slot is sealed by two opposed strips of double sided transparent tape 80. In this manner, the quantity of product remaining in the clear bag 25 inside the housing 24 can be easily determined by visual observation. The lower end of the product housing 24 is sealed by a cover 82 having a side portion 84. The cover is retained on the housing by a sealing tape 86 which when removed, exposes the inwardly tapered flaps 34 of the meter housing 26 defined on the bottom of the product housing 24. The cover 82 is provided to protect the meter housing and to prevent any accidental discharge of product from the product bag 25 through the meter assembly, before the product container is mounted in its operating position in the hopper of the spreader.

Figure 6A:
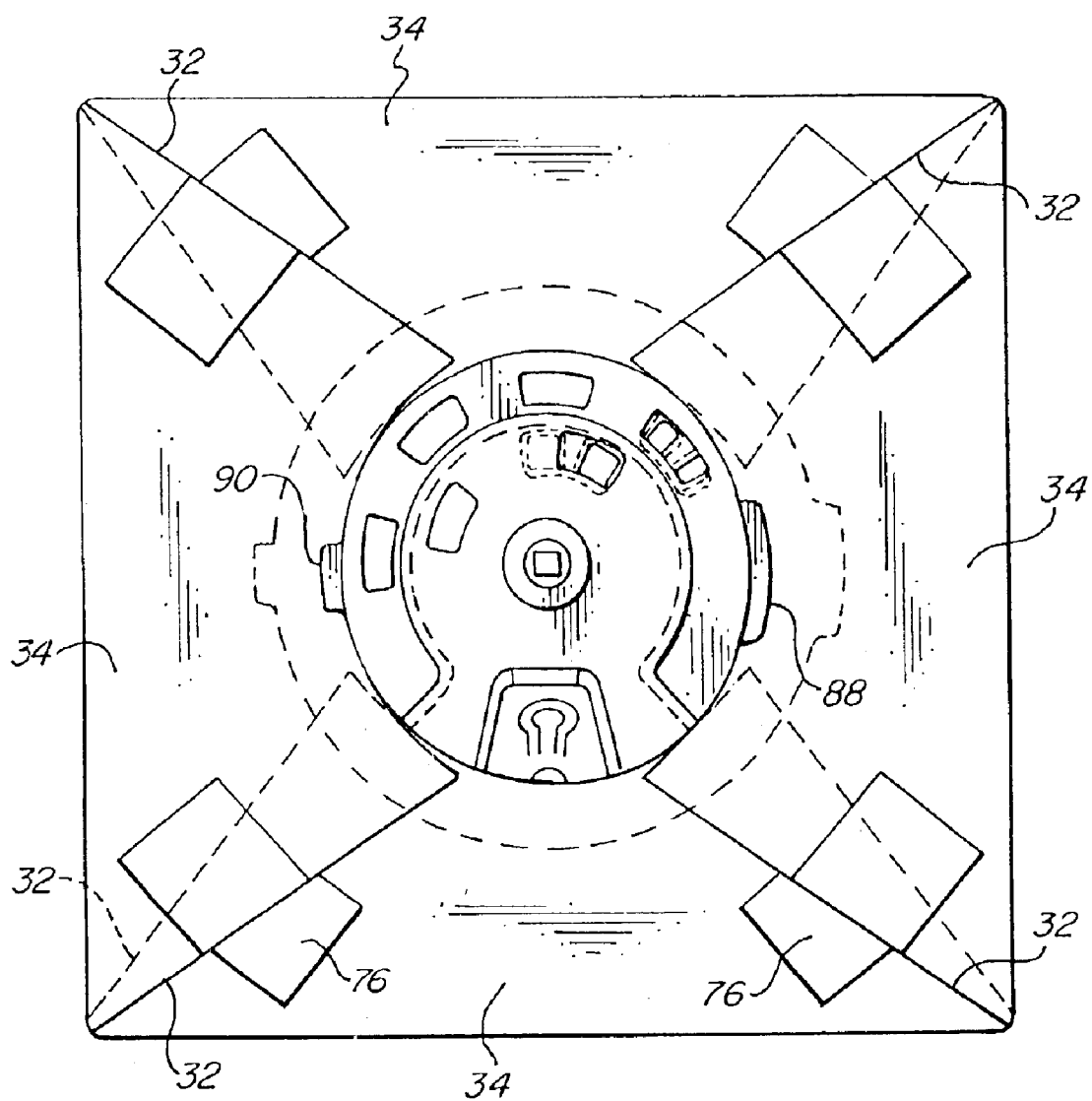
FIG. 6A illustrates a bottom plan view of the product container illustrated by FIGS. 2–5 with the meter assembly in a closed position.
Figure 6B:
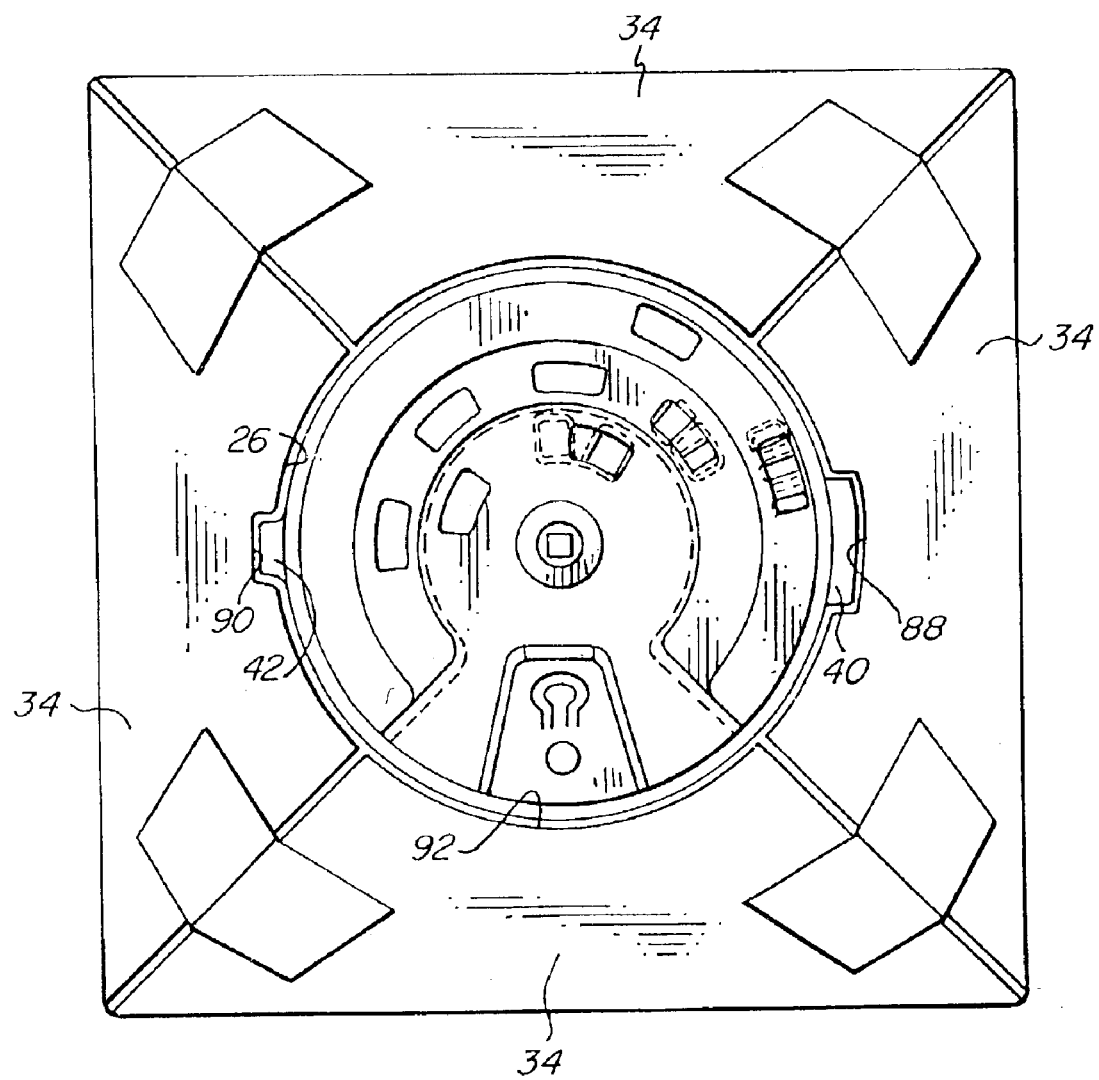
FIG. 6B illustrates a bottom plan view of the product container with the meter assembly in a partially opened position.

FIGS. 6A and 6B illustrate, respectively, the product container 24 with its flaps 34 in a folded position when the cover 82 seals the bottom of the product container, and the product container 24 when the flaps 34 expand outwardly and are restrained by the tape 76 when the cover 82 is removed from the bottom of the product container 24 exposing the meter housing 26. Keys 40 and 42 of the meter housing 26 (see FIG. 2) lock into cut-outs 88 and 90 in the flaps 34 to prevent the meter housing 26 from rotating relative to the product housing 24. When the cover 82 is removed from the bottom of the product housing 24 by removing sealing tape 86 (see FIG. 4) to permit the tapered flaps 34 of the bottom portion of the product housing 24 to expand outwardly, an opening 92 is defined between the inner surfaces of the flaps at the bottom portion of the product container 24. The meter housing 26 then slides through the opening 92 and is locked into its fixed, non-rotatable position relative to the lower portion of product housing 24 (as shown in FIG. 2) by the complementary locking mating keys and cut-outs on the meter housing, the flaps of the product housing, and the components of the meter assembly, as discussed herein.

FIG. 5 illustrates, in detail, the lower side portion of the product container of FIG. 2 showing the manner in which the meter housing 26 is mounted in its operational position to the lower (discharge) end of the product housing 24. As discussed with respect to FIG. 2, the lower edge of the meter housing 26 is rolled inwardly to form a lip 50. A downwardly sloped outer edge 48 of a discharge plate 72 is received in and supported by the rolled lip 50. An outwardly extending, horizontally oriented edge 52 of a selector plate 74 is disposed beneath the rolled lip 50 to support the meter housing 26 and to prevent displacement of the components of the meter assembly upwardly into the meter housing. The selector plate 74 is itself supported by a bushing flange 56 of a drive bushing 54. In this manner, the meter housing 26 provides support to, and is itself supported by, components of the meter assembly housed therein.

Figure 7A:
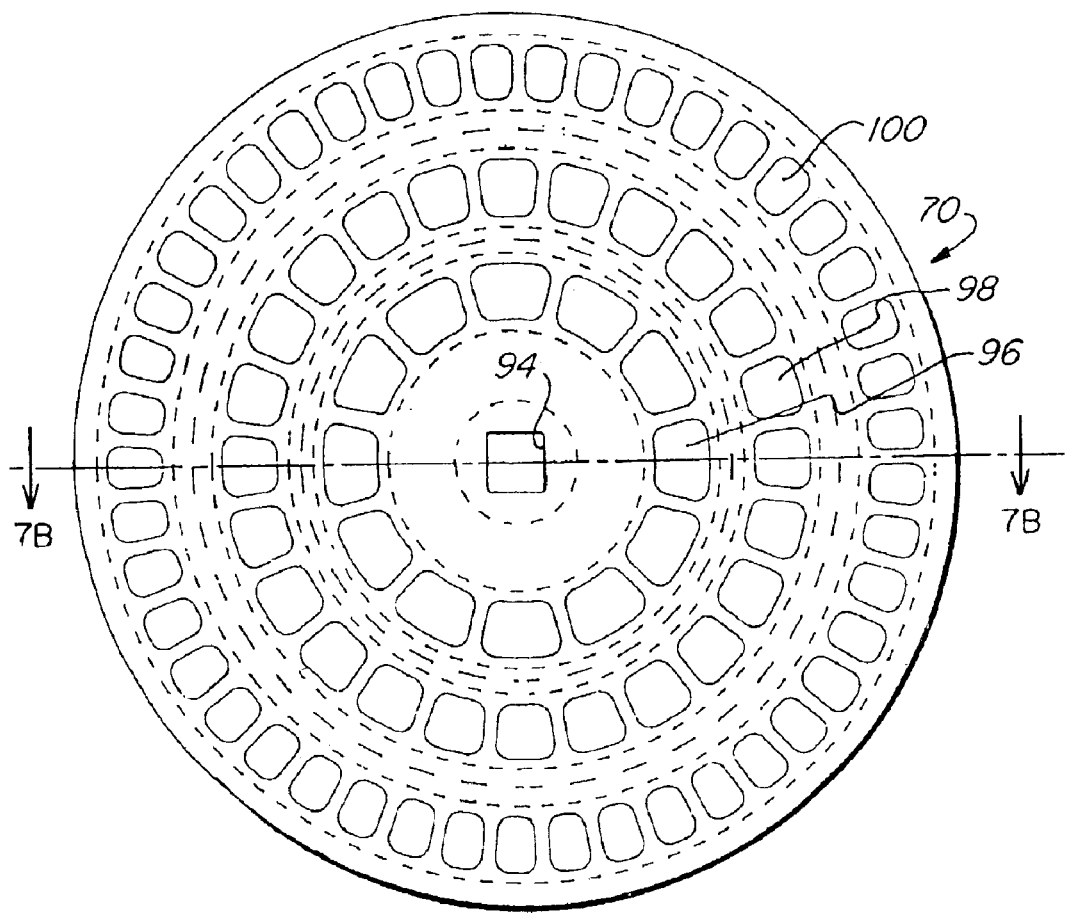
FIG. 7A is a top plan view of a metering disk of the meter assembly of the present invention.
Figure 7B:
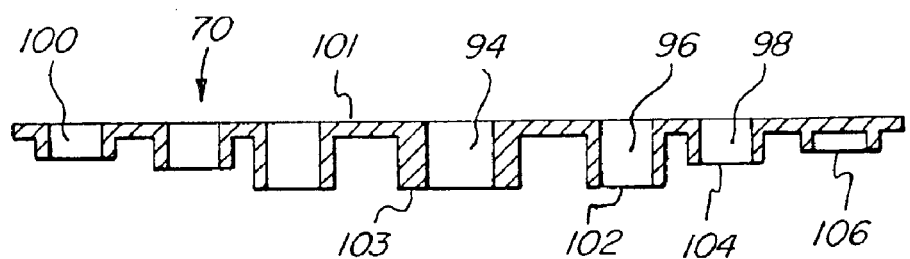
FIG. 7B is a side elevational view, in section, of the metering disk illustrated by FIG. 7A.

Referring now to FIGS. 7A and 7B, the metering disk 70 generally illustrated in FIG. 2, is shown in greater detail. FIG. 7A shows a top plan view of the metering disk 70 which defines a plurality of concentric rows of openings, spaced radially apart from the center of the disk which defines a square opening designated by reference numeral 94. The square opening 94 corresponds to and is adapted to receive a square drive carried by a drive shaft extending through the bushing 54 (see FIG. 2) which is coupled to a wheel of the spreader by a drive train for imparting rotary movement to the metering disk as the spreader is driven linearly over the terrain to be treated. The concentric rows of openings in the metering disk 70 arc defined by openings 96 forming an innermost row, openings 98 forming an intermediate row, and openings 100 forming an outermost row. As shown in FIG. 7A, the three concentric rows are not spaced equidistantly from each other in a radial orientation, and the size, number and configuration of the individual openings forming each different row can differ from the openings forming the other concentric rows. In the metering disk illustrated by FIG. 7A, the openings in each of the rows are spaced equidistantly apart from adjacent openings in the same row, and the openings in each row are of the same configuration and dimension as each of the other openings in the same row. The configuration, dimension, and spacing of the individual openings and the different concentric rows, as well as the number of openings and rows in the metering disk 70, is variable. Accordingly, the specific configuration and orientation of the openings and rows illustrated by FIG. 7A is not critical to the invention, and can be varied from that shown. The specific parameters of the metering disk can be pre-set for the specific material being dispensed, since the meter assembly and product container comprise a single unit.

FIG. 7B is a sectional view of the metering disk 70 illustrated by FIG. 7A. As more clearly seen, each of the openings 96, 98 and 100 are vertical channels defined between an upper surface of the metering disk designated by reference numeral 101, and a lower surface of the metering disk designated by reference numeral 103. The vertical length and volume defined by each channel is variable, and decreases as the radial distance from the center 94 of the metering disk increases. Reference numeral 102 designates the lower openings defined of the channels 96 of the inner row; reference numeral 104 designates the lower openings of the channels 98 of the intermediate row; and reference numeral 106 designates the lower openings of the channels 100 of the outer row.

Figure 7C:
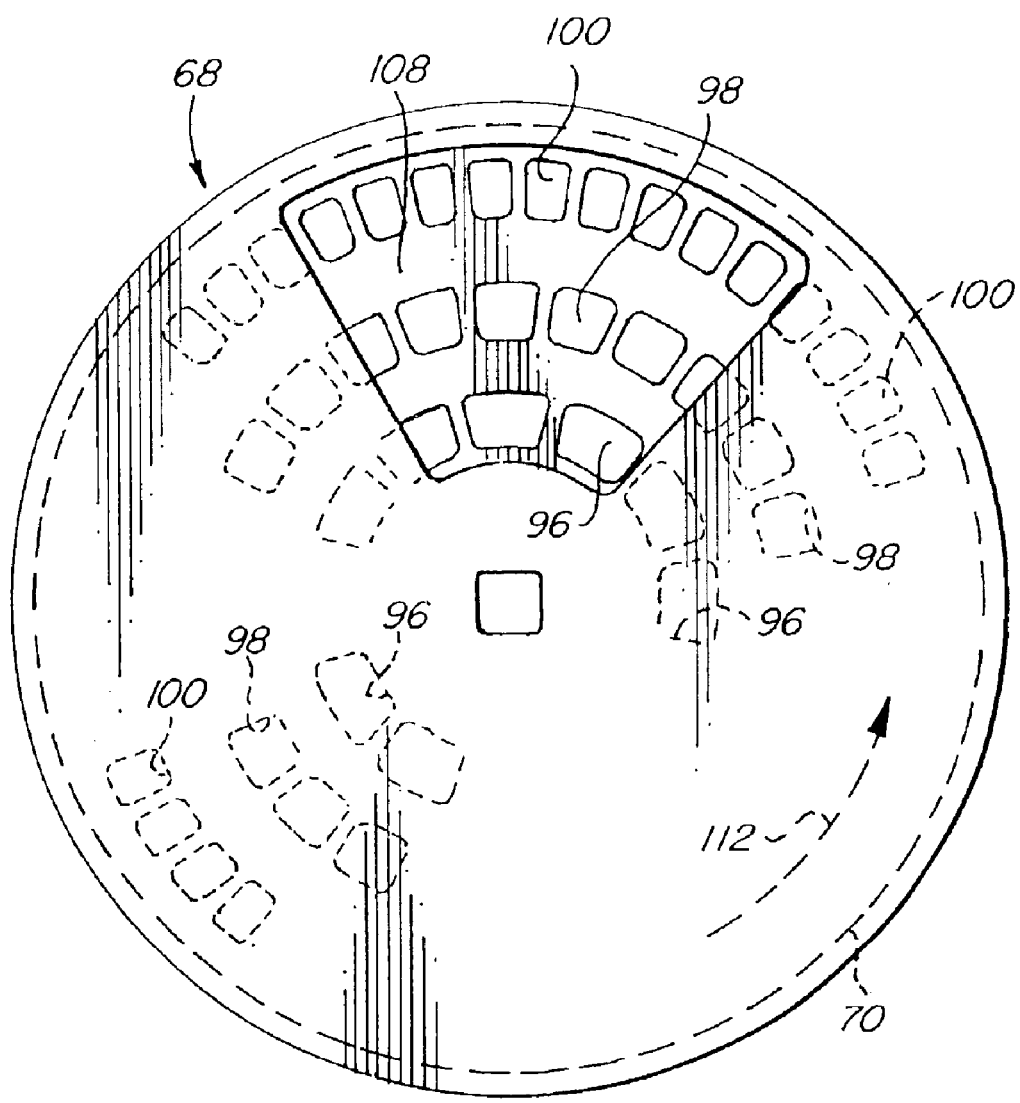
FIG. 7C illustrates the relationship between the metering disk and a charging plate operatively associated therewith.
Figure 8A:
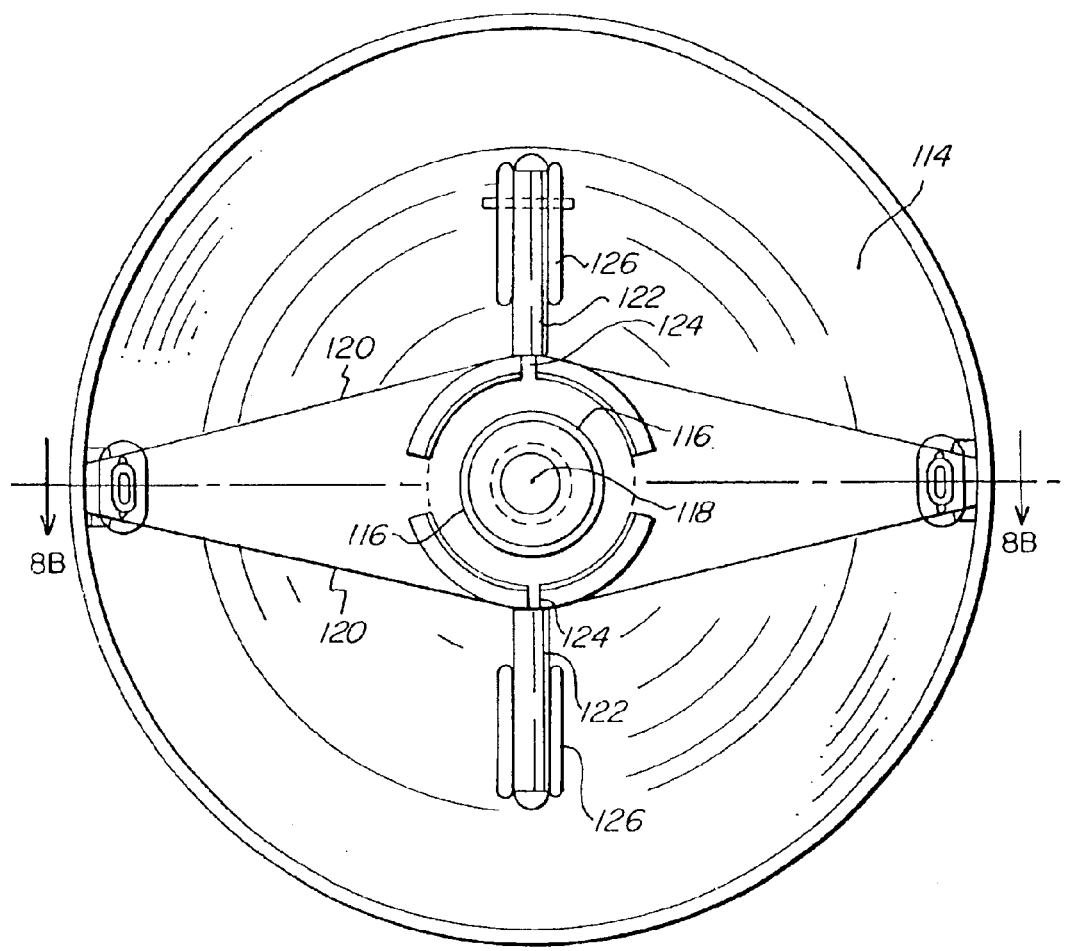
FIG. 8A illustrates a top plan view of a dispersing impeller in accordance with the present invention.
Figure 8B:
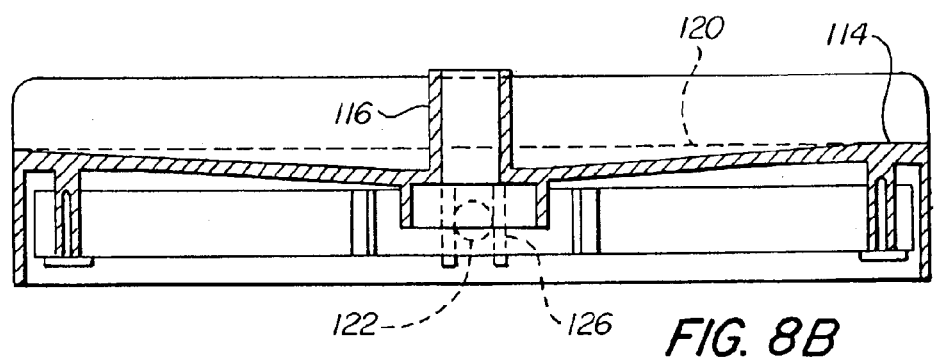
FIG. 8B illustrates a side elevational view, in section, of the dispersing impeller illustrated by FIG. 8A.

FIG. 7C illustrates the charging plate 68, shown in FIG. 2, which is arranged above and contiguous with the top surface 101 of the metering disk 70. The charging plate 68 is fixedly mounted relative to the rotatable metering disk 70 and includes an arcuate slot portion 108 exposing different sections of the concentric rows of the opened tops of the vertical columns 96, 98 and 100 on the metering disk as the metering disk rotates relative to the fixed charging plate. In this manner, granular material is gravity fed from the product bag 25 (see FIG. 2) and through the opened slot portion 108 of the charging plate 68, to sequentially fill the uncovered vertical columns 96, 98 and 100 in the metering disk as the metering disk rotates relative to opened slot portion 108 of the fixed charging plate. After the uncovered columns 96, 98 and 100 have been filled with granular material, any residual material extending from the columns 96, 98 and 100 above the top surface 101 of the metering disk is wiped away by the forward edge 110 of the slot 108 as the metering disk 70 rotates relative to the charging plate in the direction designated by arrow 112. In this manner, each of the uncovered columns 96, 98 and 100 are filled to their maximum volume by the granular material gravity fed from the product container. Filling each of the vertical columns in the metering disk to its full capacity assures that material will be sequentially metered in repeatable uniform quantities and dispersed from the spreader apparatus at uniform density over the terrain to be treated.

Referring back to FIG. 2 (also see FIG. 5), a discharge plate 72, which is configured to correspond to the shape of the lower surface 103 of the metering disk, is mounted contiguously below the lower surface of the metering disk. The discharge plate includes a cut-out section similar to the cut-out portion defined in charging plate 68, discussed above. The discharge plate is fixedly mounted relative to the rotatable metering disk to selectively uncover the bottom openings 102, 104 and 106 of the vertical channels 96, 98 and 100 defined in the metering disk as the vertical channels rotate over the opened section of the discharge plate. The discharge plate, which is fixedly mounted relative to the rotatable metering disk, is arranged relative to the charging plate, which is also fixedly mounted relative to the rotatable metering disk, so the opened or cut-out sections of the discharge plate and charging plate are offset relative to each other. In this manner, when the tops of the vertical channels defined in the metering disk are uncovered by the cut-out section 108 in the charging plate 68 and granular material is gravity fed to fill these channels to their maximum capacity, the bottoms of these vertical channels are covered by the discharge plate to retain the material in the vertical channels until these channels are filled to their maximum capacity. Thereafter, the metering disk rotates relative to the fixedly mounted charging and discharge plates so that the tops of the filled channels are covered by the closed section of the charging plate, and the bottoms of the filled channels are moved over the cut-out portion of the discharge plate to uncover the bottoms of the filled channels to permit material to be discharged from the channels by gravity feed. The cooperating operating relationship between the charging plate, the discharge plate and the rotatable metering disk assures that a repeatable uniform volume of metered material is sequentially discharged through the metering assembly during operation of the spreader.

Although the preferred embodiments of the invention provide a meter disk rotatable relative to fixed charging and discharging plates, it is also possible to provide a metering system including a fixed metering disk with charging and discharge plates rotatable relative to the metering disk. However, this alternative embodiment is less desirable in that it requires two rotatable elements instead of one, thereby increasing the required number of movable components.

Still referring to FIG. 2 (also see FIG. 5), a selector plate 74 is fixedly mounted beneath the lower surface of the discharge plate 72. The selector plate defines opened portions corresponding to the positions of predetermined vertical columns in the metering disk, and defines closed portions which block or cover the bottoms of other predetermined vertical columns in the metering disk. In this manner, rotation of the metering disk relative to the discharge plate, as discussed above, will not uncover the lower openings in the vertical columns of the metering disk which are blocked by the selector plate. Essentially, the selector plate overrides the discharge plate by blocking portions of the cut-out section of the discharge plate through which material from columns in the metering disk would otherwise be discharged. By selectively blocking certain vertical columns of the metering disk, and by allowing material to be discharged from other vertical columns of the metering disk through the discharge plate, the selector plate controls the position on which the discharged material is deposited, by gravity feed, onto a rotatable disperser impeller of the spreader apparatus disposed beneath the selector plate.

The position on which material from the metering disk is deposited on the rotatable impeller controls the distance or range from which the material is propelled from the spreader by the spinning impeller. If the selector plate 74 is arranged to block discharge of material from the outer concentric row of columns 100 of the metering disk (See FIGS. 7A and 7B), material will be deposited closer to the center of the spinning impeller, thereby decreasing the range which the material is propelled from the impeller by applied rotational forces. On the contrary, if the inner concentric rows of columns 96 and/or 98 of the metering disk (See FIGS. 7A and 7B) are covered by the selector plate, material will be deposited closer to the periphery of the spinning impeller, thereby increasing the distance which the deposited material is propelled from the spinning impeller as a result of rotational forces applied thereon. Additionally, the selector plate can be arranged to block the discharge of material from different sections of the metering disk to control the angular orientation relative to the spreader apparatus at which material is propelled by the spinning impeller. Therefore, in accordance with the preferred embodiments of the present invention, the selector plate 74 cooperates with the metering disk and discharge plate to selectively control the distance and/or angular orientation at which material is discharged from the spreader and applied to the terrain being treated.

As discussed with respect to FIG. 1, the spreader 2 includes an impeller assembly 10 disposed beneath the product container 6 and the metering housing defined at the bottom of the product container. The impeller assembly includes a rotatable impeller positioned to receive material discharged by gravity feed from the metering housing and deposited on the upper surface of the impeller. The material deposited on the rotating impeller is propelled from the impeller and discharged from the spreader as a result of rotational forces applied to the deposited material. FIG. 1 generally illustrates a belt drive 12 which mechanically couples a wheel 14 of the spreader to the impeller assembly 10 to impart rotational motion to the impeller as the spreader moves linearly along the terrain 16.

FIG. 8A illustrates the components of the impeller assembly which include a rotatable impeller comprising a disk designated by reference numeral 114 having a central hub portion designated by reference numeral 116 which is rotatable about a central axis designated by reference numeral 118. A drive belt 120 (which is part of the belt drive 12 of FIG. 1) engages the outer periphery of the central hub 116 to impart rotational movement to the impeller 114. As the spreader 2 is moved along the terrain 16 and the wheels 14 are rotated, rotational movement proportional to the linear speed of the spreader is imparted to the disk 114 by the belt drive 12.

As discussed herein, the metering assembly of the product container removably received in the hopper of the spreader includes means for controlling the position on which material from the product container is deposited, by gravity feed, onto the impeller. In this manner, the range or distance at which material is propelled by the impeller is controlled—the range increases as the material is deposited closer to the periphery of the impeller, and the range decreases as material is deposited closer to the center of the impeller. In addition to the position at which material is deposited on the impeller, the rotational speed of the impeller is another parameter which affects the range or distance at which material is propelled from the spreader—increasing the rotational speed increases the distance material is propelled, and decreasing the rotational speed decreases the distance at which material is propelled from the spreader. In accordance with the preferred embodiments of the present invention, means are provided for maintaining the rotational speed of the impeller 114 at a predetermined constant value independent of variations in the linear speed at which the spreader moves along the ground.

Referring back to FIGS. 8A and 8B, two opposed weights 122 are coupled to the central hub 116 of the impeller 114 by springs 124. The weights 122 are movable in a radial direction away from the hub 116 against the resilient force applied by the springs 124, and are movable in a radial direction towards the central hub 116 by the resilient force applied in that direction by the springs 124. The weights 122 are movable in grooves or guide elements 126 provided on the impeller. The weight and spring characteristics are selected to maintain the rotational speed of the impeller 114 at a preselected value. If, for example, the spreader 2 is driven at a linear speed which would cause the impeller 114 to rotate above the preselected rotational speed, the weights 122 move radially outwardly towards the periphery of the impeller against the resilient forces of the springs 124, as a result of inertial forces applied on the weights, thereby decreasing the rotational speed of the impeller. On the contrary, if the linear speed of the spreader imparts a rotational speed to the impeller 114 below the predetermined value, inertial forces cause the weights 122 to be displaced inwardly towards the central hub 116 at the urging of the resilient forces applied by the springs 124, to increase the rotational speed of the impeller to the predetermined value. Accordingly, the weights 122 oscillate relative to the central hub of the impeller to adjust and maintain the rotational speed of the impeller 114 at a predetermined value which is independent of changes in the linear speed of the spreader. The fixed predetermined rotational speed of the impeller is adjustable by varying the mass of the weight 122, the resilient force exerted by the springs 124 on the weights 122, or both. Increasing the fixed rotational speed of the impeller will increase the range at which material is propelled therefrom, and decreasing the fixed rotational speed of the impeller will decrease the range at which material is propelled therefrom.

Although the rotational speed of the impeller 114 of the impeller assembly 10 of the spreader 2 is adjustably set at a constant predetermined value to maintain a constant range at which material is impelled from the spreader, the metering assembly in the metering housing 26 (as previously discussed herein with respect to FIGS. 2–7C), is coupled to one wheel of the spreader 2 so that material is metered in proportion to the linear speed at which the spreader 2 is moved along the ground 16 (See FIG. 1). A transmission system coupled to a wheel 14 of the spreader imparts rotational movement to the metering disk 70 in direct proportion to the linear speed of the spreader 2. In this manner, the rate at which material is metered through the metering disk and deposited onto the impeller is proportional to the linear speed of the spreader so that the density of material dispersed over the terrain travelled by the spreader remains constant. In the preferred embodiments of the invention, the rotational movement of the wheel 14 is imparted to the metering assembly 26 in the product container 6 (See FIG. 1) by a transmission system including a rotatable drive shaft extending through the drive bushing 54 of the metering housing 26 (See FIG. 2), and a square drive carried by the drive shaft and received in the square central opening of the rotatable metering disk.

Therefore, the spreader in accordance with the present invention, as discussed herein, includes both means for dispersing material at a uniform density over the terrain to be treated, and means for maintaining a constant range at which the material is dispersed by the spreader independent of the linear speed at which the spreader moves along the terrain being treated. Both the metering means and the dispersing means are driven by the linear movement of the spreader along the terrain to be treated.

Figure 9A:
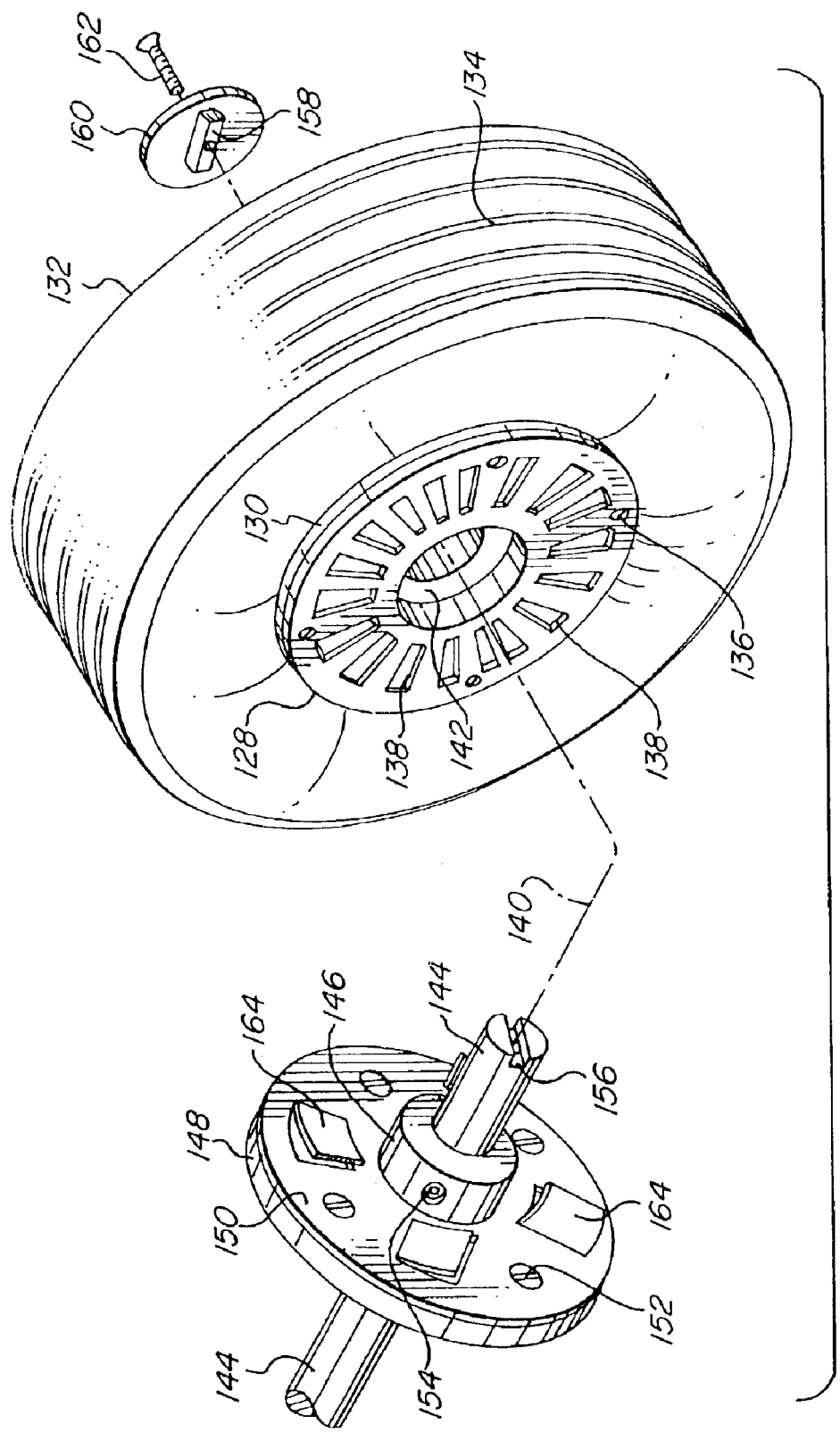
FIGS. 9A–9D illustrate a one-way clutch system in accordance with the present invention.
Figure 9B:
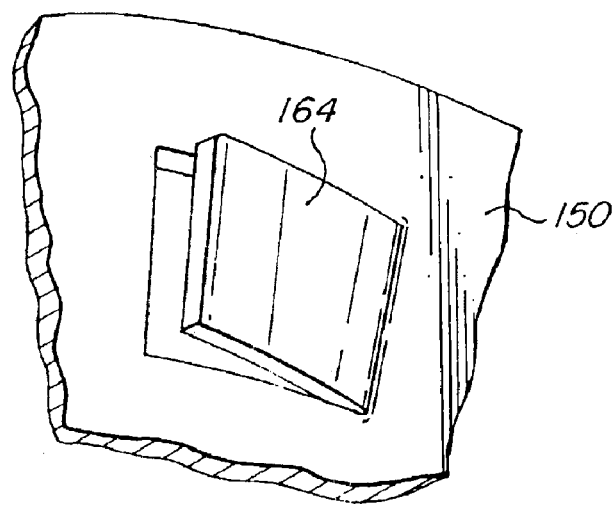
Figure 9C:
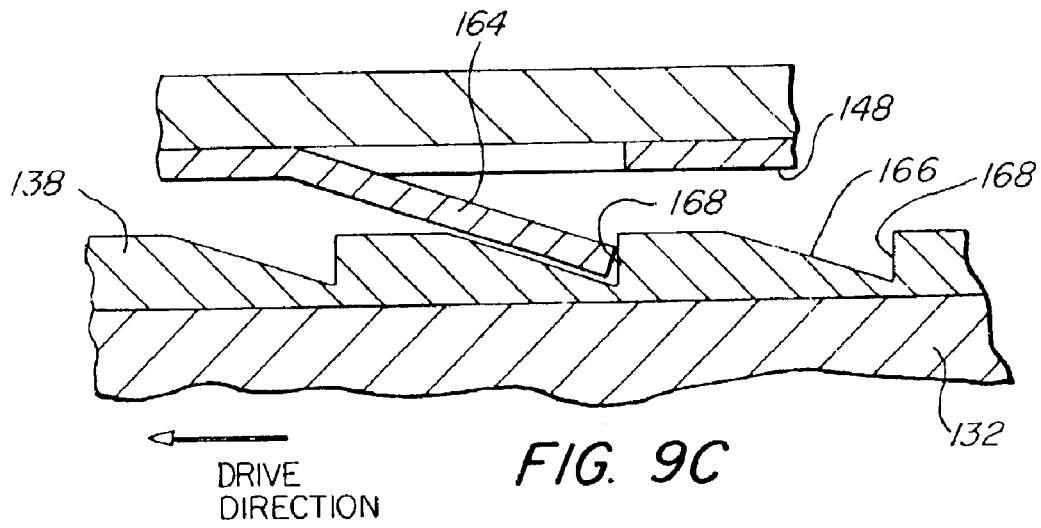
Figure 9D:
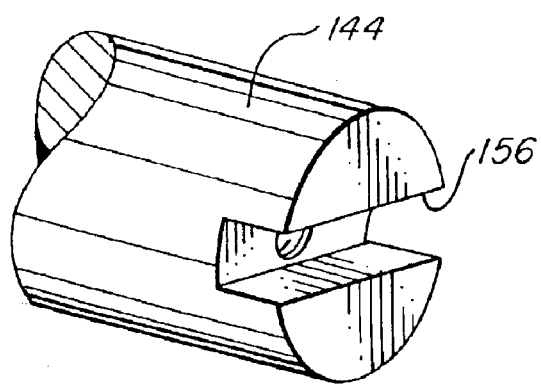
Figure 10:
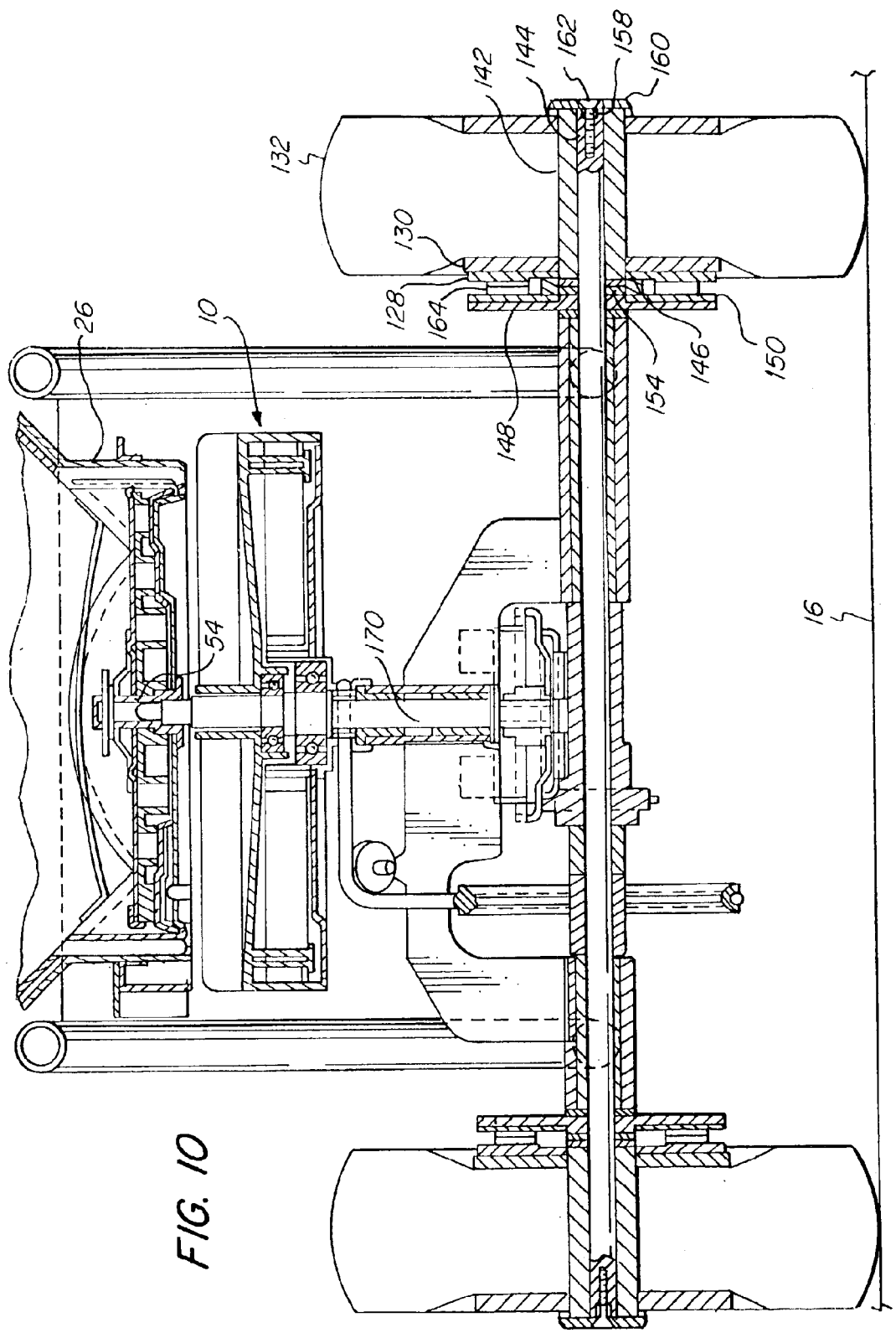
FIG. 10 illustrates a front elevational view of a dispersing apparatus, in section, showing the clutch system of FIGS. 9A–9D coupled by a drive train to the meter assembly of the dispersing apparatus in accordance with the present invention.

FIGS. 9–10 illustrate the transmission system for the spreader 2, and in particular a one way spring clutch, in accordance with the preferred embodiments of the present invention. Referring first to FIGS. 9A–9D, a wheel 132 having an outer surface 134 (corresponding to wheel 14 generally illustrated by FIG. 1), has a drive plate 128 fixedly mounted to a central rim 130 by screws 136. The drive plate 128 defines a plurality of saw teeth 138 arranged in a circular row. The drive plate 128 also defines a center axis 140 and a bushing 142 for receiving a bearing shaft 144 extending from a hub 146 of a driven plate 148. A pin 154 secures the shaft 144 to the hub 146 so that the shaft 144 rotates together with the driven plate 148. The driven plate 148 defines a spring plate 150 on the forward surface thereof, and a plurality of spring tabs 164 extend outwardly from the plate 150. Shaft 144 is received in the bushing 142 of the drive plate 128, and is secured thereto by a rib 158 defined on an end cap 160 which is received in a groove 156 of the shaft 144 after the shaft extends through the center axis 140 of the drive plate 128. The end plate 160 is further secured to the remote end of the shaft 156 extending through the center axis 140 by a screw 162 received through aligned openings in the rib 158 on the end cap 160 and in the slot 156 of the remote end of the shaft 144. Because the drive plate 128 is fixedly mounted to the rim 130 of the wheel 132 by screws 136, the drive plate is rotatable together with the wheel.

As more clearly seen in FIG. 9C, the saw teeth 138 defined on the drive plate 128 each include a sloped portion designated by reference numeral 166 and a perpendicular end portion designated by reference numeral 168. The free forward ends of the spring tabs 164, extending from the spring plate 150, are engaged by the saw teeth 138 when the driven plate 148 is mounted to the drive plate 128 such that the spring plate 150 is in continguous engagement against the drive plate 128. When the wheel 132 is rotated in a predetermined drive direction (i.e., the direction of rotation of the wheel 132 when the spreader is moved in a forward linear direction) as illustrated by FIG. 9C, the perpendicular rear ends 168 of the saw teeth 138 engage the free forward ends of spring tabs 164 and impart the rotational movement of the wheel 132 to cause the spring plate 150 to rotate together with the wheel. However, when the wheel is rotated in a reverse direction, the free forward end of the spring tabs 164 move in a direction relative to the saw teeth 138 to slide up the inclined sections 166 thereof, and do not engage the perpendicular end sections 168. Accordingly, the drive plate 128 does not engage the spring plate 150 in this reverse direction of rotation, and the rotational movement of the wheel 132 is not imparted to the spring plate 150, thereby creating a slip or clutch condition. Therefore, rotational movement of the wheel 132 in a forward direction imparts rotational motion to the spring plate 150, while rotational movement of the wheel 132 in the opposed direction will not impart rotational motion to the spring plate 150.

FIG. 10 is a front elevational view of the spreader 2 shown in FIG. 1, with the product container 6 mounted thereon. FIG. 10 further illustrates the spring plate 150 and the wheel 132, as shown in FIGS. 9A–9D, assembled in operational position. The same reference numerals have been used in FIG. 10 to designate corresponding elements illustrated in FIGS. 9A–9D.

When the spreader is linearly moved along the ground 16 in a forward direction, the drive plate 128 rotatable with the wheel 132 engages the driven plate 148, transferring rotational movement to the driven plate and causing the shaft 144 fixedly mounted to the driven plate to rotate at a speed corresponding to the rotational speed of the wheel. The rotational movement of shaft 144 is transferred, through a drive train in the transmission system of the spreader, to a vertical drive shaft, designated generally by the reference numeral 170, which is received within the drive bushing 54 of the meter housing 26 provided at the lower end of the product container 24 removably mounted to the hopper of the spreader. (See also FIGS. 1 and 2.) As discussed herein, the metering disk of the metering assembly is rotatable at a speed proportional to the linear speed of the spreader to assure that the product dispersed by the spreader is applied to the terrain to be treated at uniform density. The impeller assembly of the spreader is separately driven by a belt drive coupled to a rotating wheel. Accordingly, when the spreader device is driven in a forward direction and the transmission system coupling the meter assembly to a rotating wheel is engaged, material is deposited on the spinning impeller by gravity feed from the metering disk, and is dispersed from the impeller by rotational forces applied to the deposited material. However, when the spreader is moved in a reverse direction and the clutch system described herein prevents the rotational movement of the wheel from being transmitted to the metering system, no material is is deposited on the impeller from the metering disk. Accordingly, although the impeller continues to rotate as a result of its independent coupling to the rotating wheel by the drive belt, no material will be deposited on the impeller, and thus no material will be discharged from the spreader. Additionally, the on/off switch 22 on the handle 20 of the spreader device (See FIG. 1) disengages the meter assembly and prevents material from being discharged from the spreader apparatus, at the selection of the user, when the spreader is moved in a forward direction. Therefore, the spreader in accordance with the preferred embodiments of the invention automatically prevents material from being dispensed therefrom when it is driven in a reverse direction, but includes means to permit the user to selectively prevent material from being dispersed therefrom when it is driven in a forward direction.

FIGS. 11–20 illustrate a further embodiment of a dispersing apparatus, and a product container, in accordance with the present invention. Common elements illustrated by FIGS. 11–20 will be designated by the same reference numerals used to designate the same elements in FIGS. 1–10. Except as otherwise indicated in the following discussion of FIGS. 11–20, the metering, drive train, and control systems discussed with respect to FIGS. 1–10 are applicable to the embodiments of the invention illustrated by FIGS. 11–20.

The spreader apparatus 2 includes a hopper 4 for removably receiving a product container 6. The lower portion of the product container includes a metering assembly, generally designated by reference numeral 170, for controlling the flow of material by gravity feed through a bottom discharge outlet, generally designated by reference numeral 172, of the product container 6. A rotatable impeller 10 is disposed beneath the container discharge outlet 172 for receiving and dispersing product deposited thereon by the metering assembly, in accordance with the general operation of the granular spreader previously described with respect to FIGS. 1–10. As also discussed with respect to FIGS. 1–10, at least one of the wheels 14 is coupled by a drive train to the impeller 10 for rotating the impeller as the spreader apparatus traverses the terrain to be treated, and a clutch system designated by reference numeral 174 is provided to enable the operator of the apparatus to selectively disengage the wheels 14 from the drive train.

In accordance with a first improvement of the spreader apparatus illustrated by FIGS. 11–19, a clutch housing 176 enclosing a clutch 174 has a beveled outer edge 178 which is oriented in a direction facing the inner surface of the wheel 14. In this manner, noise generated by the clutch as the spreader apparatus travels over the terrain to be treated is reduced and muffled by reflecting sound waves towards the inner surface of the wheel 14 for promoting quieter operation of the apparatus.

In a further improvement of the spreader apparatus, the drive train coupling one of the wheels 14 to the impeller 10 includes a drive belt 180 with sprocket openings 182 which engage drive pins 184 of a capstan 186. The drive belt with openings provides a positive drive force which is superior to an O-ring belt design.

The broadcast spreader illustrated by FIGS. 11–19 includes an overriding clutch designated by reference numeral 188. The overriding clutch is disposed in the drive train coupling one of the wheels 14 to the rotatable impeller 10. The overriding clutch, which is operatively associated with the drive belt 180, permits the impeller 10 to continue to rotate, for a limited period of time, after the wheels 14 stop rotating. In this manner, the impeller continues to rotate even after the spreader apparatus has come to a halt for dispersing any residual material remaining on the impeller 10 after the apparatus has ceased movement. The removal of residual material assures that the proper quantity of material metered from the product container will be deposited on, and dispersed by, the impeller 10 when movement of the spreader over the terrain to be treated resumes.

Figure 11:
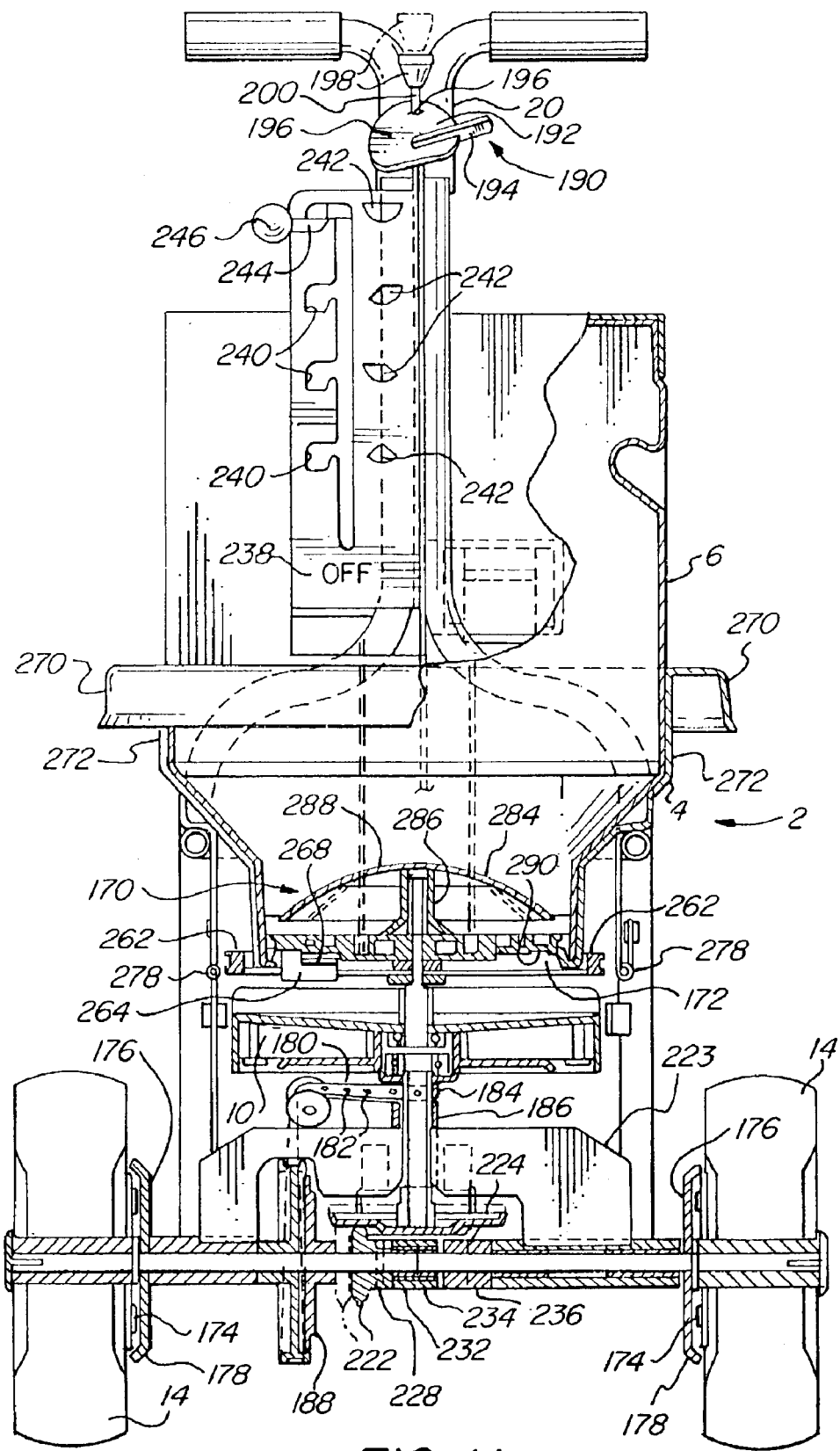
FIG. 11 is a front elevational view of a further embodiment of a dispensing apparatus in accordance with the present invention.
Figure 12:
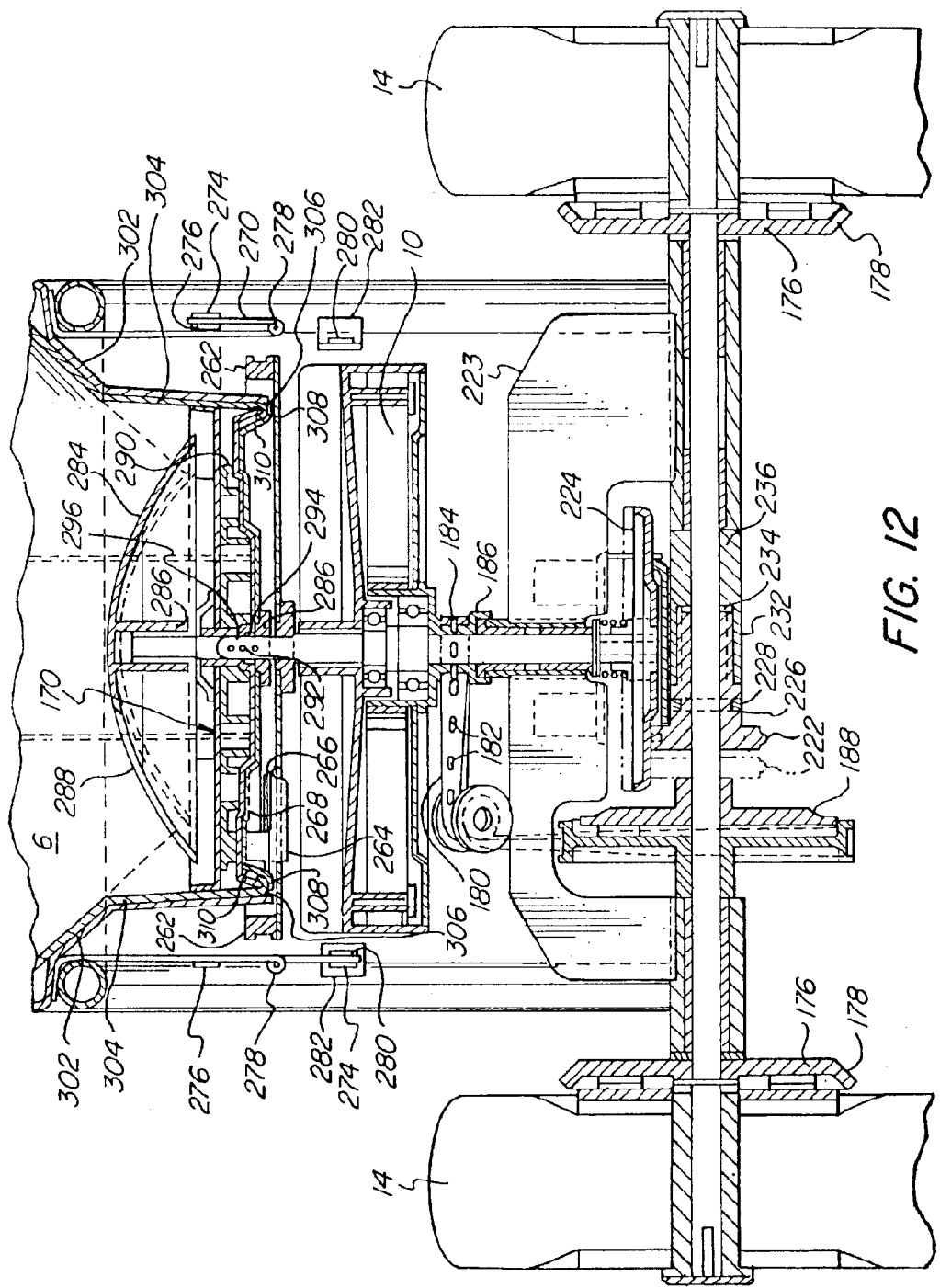
FIG. 12 is a front elevational view showing the bottom detail of the dispensing apparatus illustrated by FIG. 11.
Figure 13:
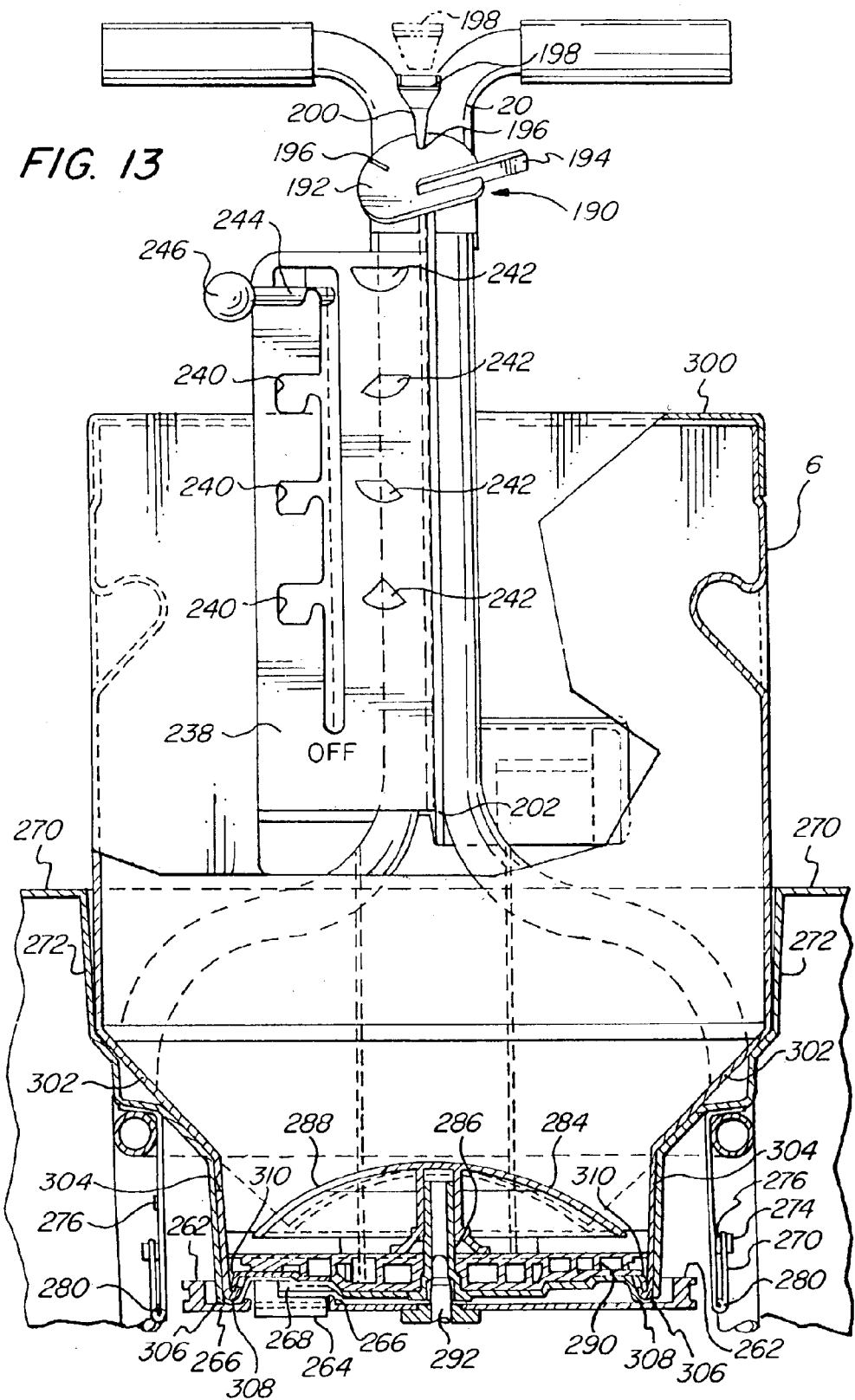
FIG. 13 is a front elevational view showing the top detail of the dispensing apparatus illustrated by FIG. 11.
Figure 14:
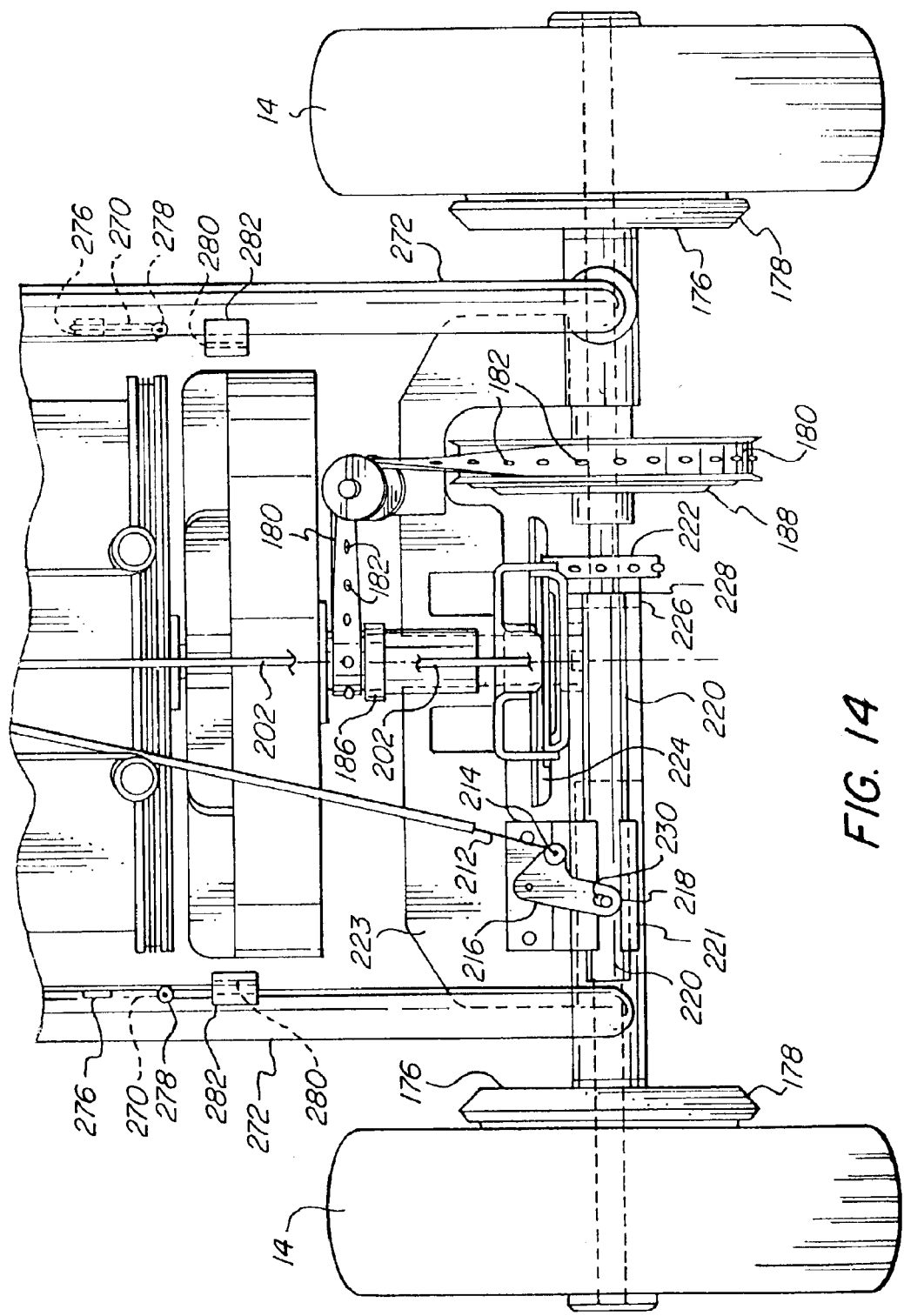
FIG. 14 is a rear elevational view of the bottom detail of the dispensing apparatus illustrated by FIG. 11.
Figure 17:
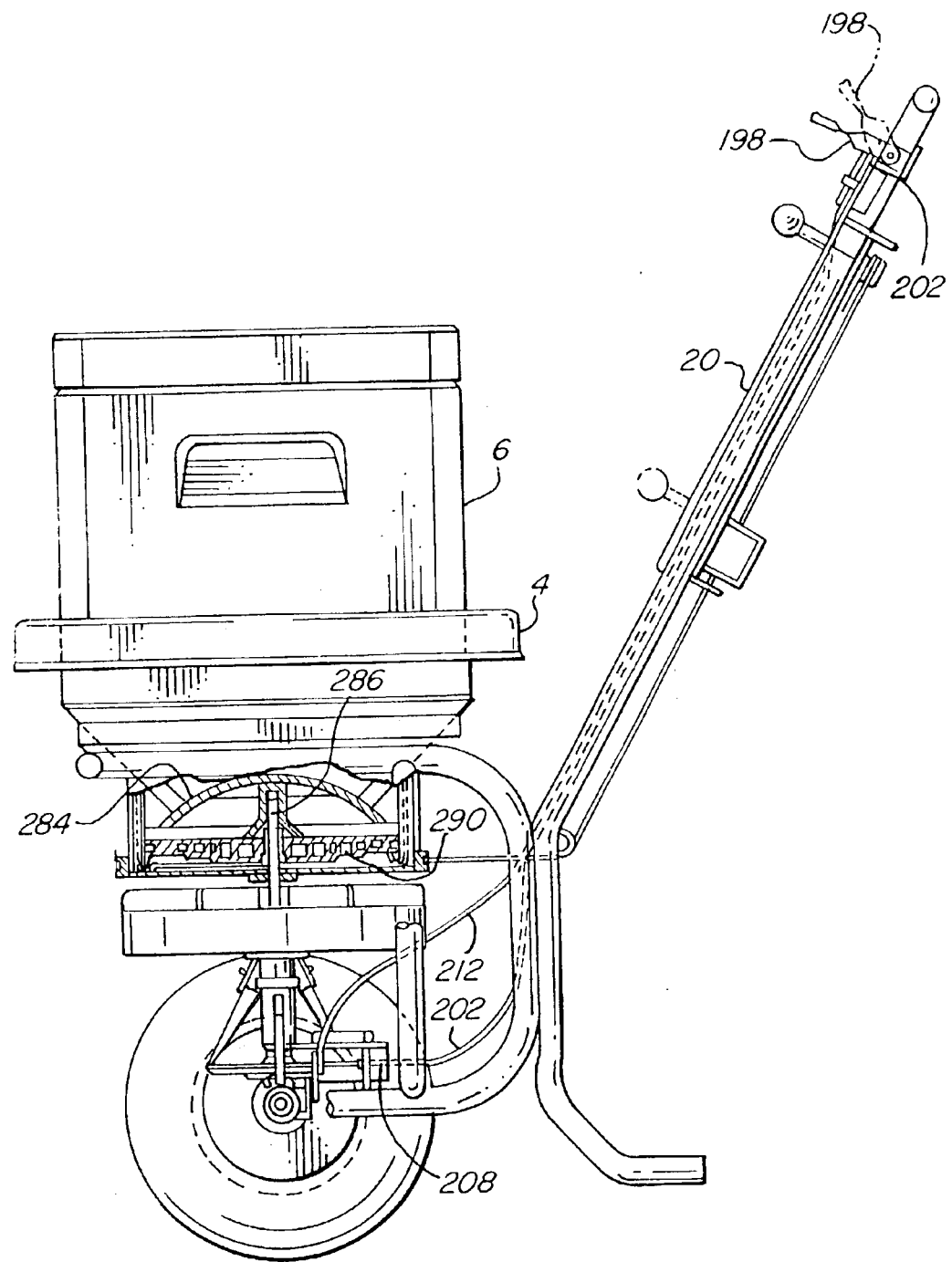
FIG. 17 is a left side elevational view of the dispensing apparatus illustrated by FIG. 11.
Figure 18:
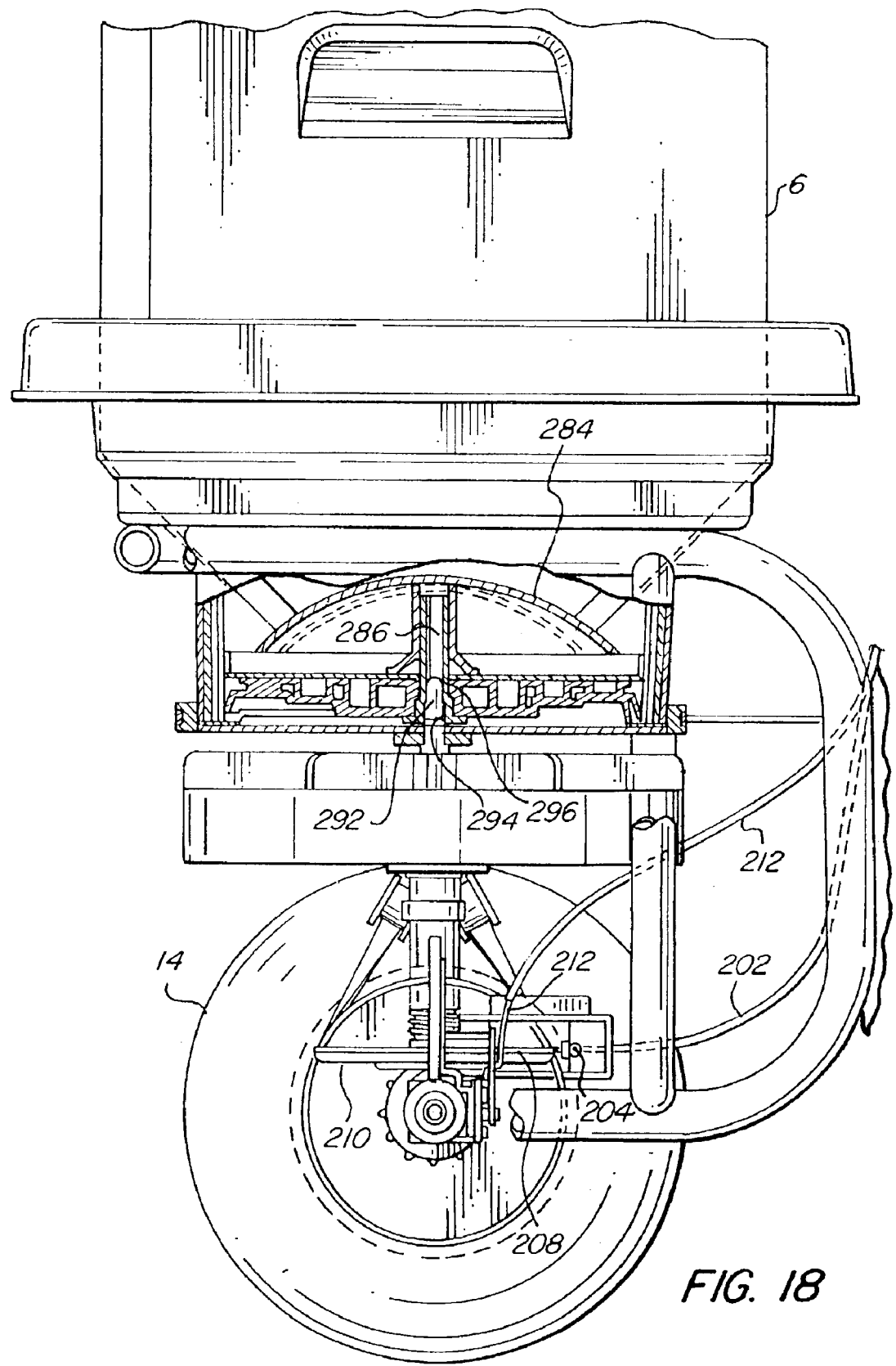
FIG. 18 is a left side elevational view of the lower detail of the dispensing apparatus illustrated by FIG. 11.

In a further improvement of the spreader apparatus illustrated by FIGS. 11–19, means are provided by which the operator can selectively adjust the rotational speed ratio of the impeller relative to the rotational speed of the wheels 14 between two or more predetermined speed ratios. In this manner, the operator can select the rotational speed of the impeller, which is proportional to the range at which material deposited on the impeller is propelled therefrom. The speed ratio of the impeller is controlled by a switch located proximate to the top of a handle 20 of the spreader. The switch, generally designated by reference numeral 190, is formed from a selector plate 192 having a tab 194 extending therefrom. The selector plate defines at least two slots 196, each of which correspond to a different one of a plurality of predetermined rotational speeds of the impeller 10. As illustrated by FIGS. 11 and 13, an on/off selector lever 198 includes a portion 200 received in one of the slots 196 of the selector plate 192. As best shown by FIGS. 14 and 17–18 of the drawings, a cable 202 is coupled between the on/off lever 198 and a pivot 204 of a toggle 206 for controlling the position of a lifting fork 208 (See FIG. 16). Accordingly, movement of the on/off lever 198 between a first position in which segment 200 is received in one of the grooves 196 of the selector plate 192, and a second position in which the on/off lever 198 is manually pivoted by the operator such that segment 200 is removed from the groove 196 of the selector plate 192, causes the cable 202 to disengage a spring loaded hub drive 210 from the drive train coupling the wheels 14 to the rotatable impeller 10 for disengaging the drive train. Accordingly, the drive train coupling the wheels 14 to the impeller 10 will automatically disengage each time the on/off lever 198 is pivoted out of one of the grooves 196 in the selector plate 192.

When segment 200 of the on/off lever 198 is received within one of the grooves 196 in the selector plate 192, the segment 200 prevents rotational movement of the selector plate 192. However, when the on/off lever 198 is pivoted out of groove 196, the selector plate 192 can be rotated by movement of the tab 194 for aligning segment 200 of the on/off lever 198 with another of the grooves 196 in the selector plate 192. The selector plate 192 is coupled by a cable 212 to a hole 214 in a crank 216 which engages a pin 218 in a horizontally movable extension bar 220 (FIG. 14), horizontal movement of the extension bar 220 resulting from actuation of the cable 212 caused by movement of the selector plate 192 enables movement and engagement of a pin drive 222 with a hub drive 224 for selectively controlling the ratio of rotational speed of the impeller 10 relative to the rotational speed of the wheels 14. This in turn controls the rotational speed of the impeller for controlling the distance which material is propelled therefrom. The selective horizontal movement of the pin drive 222 relative to the hub drive 224 is accomplished by movement of a selector fork 226 of the horizontal bar 220 through a slot 228 of the pin drive 222.

The crank 216 is coupled to the horizontally sliding bar 220 through a slot 230, as best shown in FIG. 14. The pin drive 222 employs a fluted spline 232 that engages and slides within a mating spline 234 of a drive bushing 236, as illustrated by FIG. 12. As shown by FIG. 14, the selector fork 226 of the horizontal bar 220 slides within a bracket 221 mounted to a bridge 223 of the housing of the spreader apparatus.

It is apparent from the above description that the on/off lever 198 is operatively associated with the selector plate 192 to assure that the rotational speed of the impeller cannot be switched from one predetermined speed to another unless the drive train coupling the wheels 14 to the impeller is disengaged. This occurs because the selector switch 192 can be moved by the tab 194 only when the on/off lever 198 is pivoted out of one of the slots 196. However, by pivoting the lever 198 out of any slot 196, the drive train coupling the impeller 10 to the wheel 14 is disengaged by the cable 212. Rotation of the selector plate 192 into a position in which the lever 198 is aligned with a different slot 196 causes horizontal movement of the drive pin 222 for selectively adusting the rotational speed ratio of the impeller. The position of each slot 196 on the selector plate 192 corresponds to a different predetermined rotational speed ratio of the impeller. When the slot 196 corresponding to the predetermined speed ratio desired by the operator is aligned with the position of the on/off lever 198, the lever is pivoted so that segment 200 is received in the slot 196. Pivoting the lever 198 into any slot 196 re-engages the drive train coupling the wheels 14 to the rotatable impeller 10. Thus, the selector switch 192 for controlling the rotational speed of the impeller operatively cooperates with the on/off lever 198 so that the rotational speed of the impeller can be selectively adjusted by the operator only when the drive train coupling the wheels 14 to the impeller is disengaged. Although FIGS. 11–19 illustrate two slots 196 on the selector plate 192 corresponding to two different predetermined rotational speeds of the impeller, it is within the scope of the present invention to provide more than two slots 196 corresponding to more than two different preselected rotational speeds of the impeller.

In a further improvement of the spreader apparatus illustrated by FIGS. 11–19, a generally rectangular plate 238 is carried by the handle 20. The plate includes a plurality of openings or stop positions designated by reference numeral 240, and a visual indication 242 associated with each position 240. A lever 244 has a handle 246 to permit the operator to vertically move the lever along the panel 238 between different stop positions 240. As will be discussed below, movement of the lever 244 into the different stop positions 240 permits the operator to selectively control the orientation at which material will be propelled from the impeller 10 relative to the direction in which the spreader apparatus moves along the terrain to be treated. The visual indicia 242 provide the operator with illustrations of the spread pattern for each of the different stop positions 240. (See FIGS. 11, 13 and 15).

Figure 15:
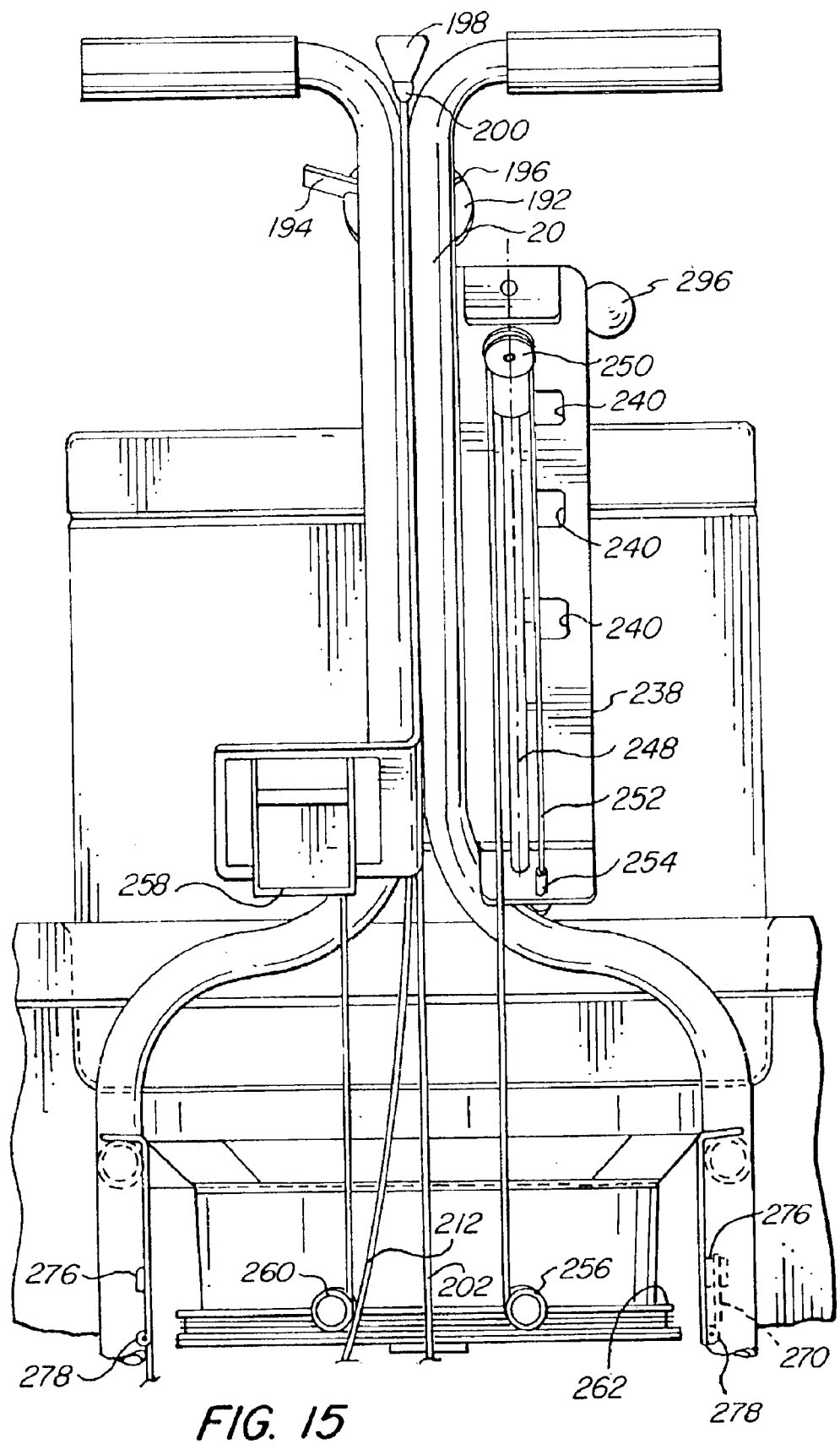
FIG. 15 is a rear elevational view of the top detail of the dispensing apparatus illustrated by FIG. 11.
Figure 16:
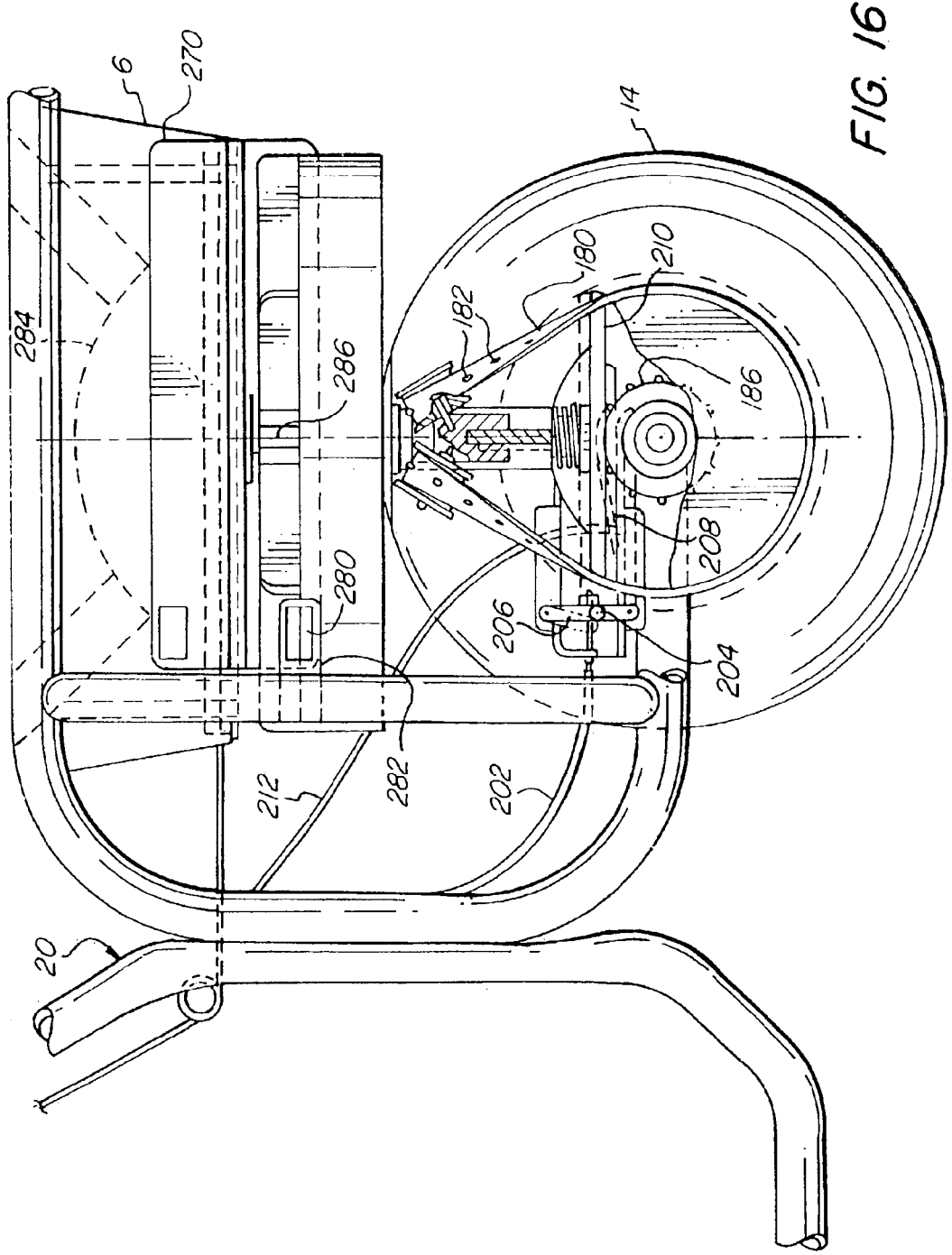
FIG. 16 is a right side elevational view of the bottom detail of the dispensing apparatus illustrated by FIG. 11.

Referring now to FIG. 15, when handle 246 is vertically moved along a support shaft 248, a pulley 250, which is coupled to the movable handle 246 (and the attached lever 244), adjusts the length of a selector cable 252. The selector cable 252 is attached to an adjustment screw 254, and the selector cable is looped around the pulley 250 down to an idler pulley 256, and then up to a selector cable take-up 258. The selector cable 252 is then looped around a second idler pulley 260, and up to the selector cable take-up 258. When the handle 246 is moved into different stop positions 240, the length of the selector cable is adjusted, thereby rotating a selector drum 262 which is operatively associated with the selector cable 252. The selector drum 262 is rotated into a position in which material will be propelled from the impeller 10 of the spreader apparatus in the orientation illustrated by the visual indicia 242 corresponding to the position 240 in which the lever 244 is received. (As discussed with respect to FIGS. 1–10, the selector plate associated with the selector drum blocks preselected openings in the metering disk to control the position at which metered product is deposited on the impeller to control the distribution pattern). When the lever is moved into the lowermost vertical position designated by "OFF", the selector drum 262 is moved into a position in which the associated selector plate completely blocks all openings in the meter disk to prevent any material from being deposited by gravity feed on the impeller 10. Therefore, the lever 244, which is readily accessible to the operator of the device, permits the operator to selectively control the distribution pattern of material propelled from the spreader apparatus as it moves along the terrain to be treated.

Figure 19:
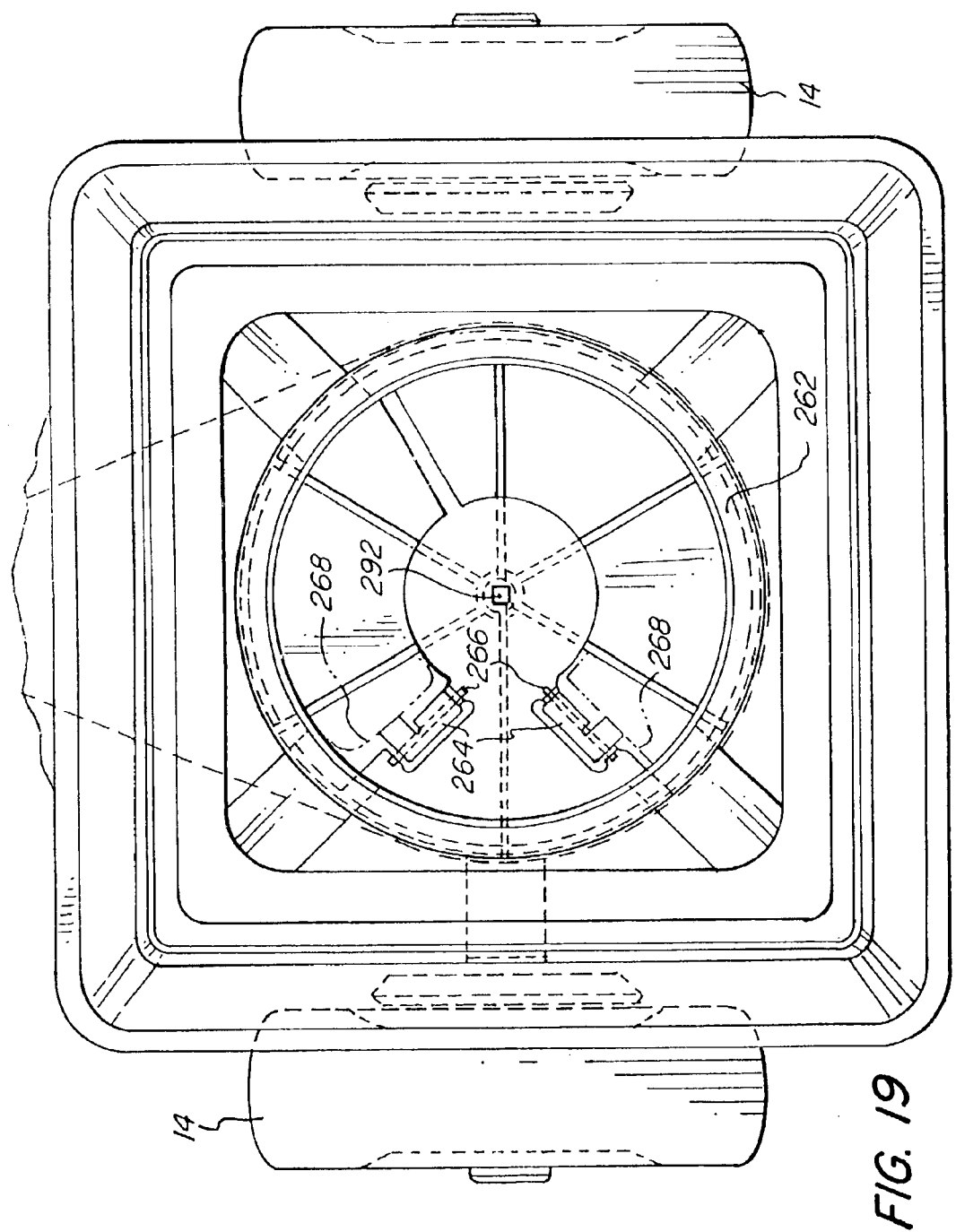
FIG. 19 is a top view of the dispensing apparatus illustrated by FIG. 11.
Figure 20A:
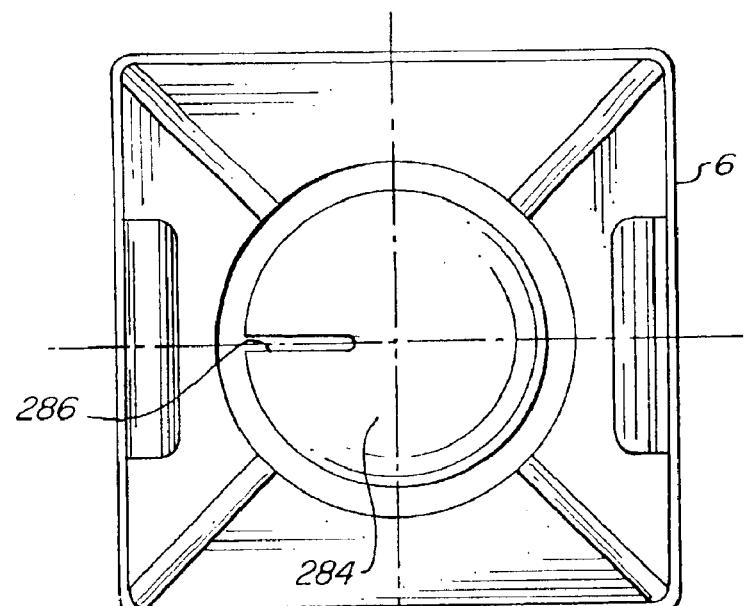
FIGS. 20a and 20b illustrate, respectively, a bottom plan view and a front elevational view in section of a container used in conjunction with the dispensing apparatus illustrated by FIG. 11.
Figure 20B:
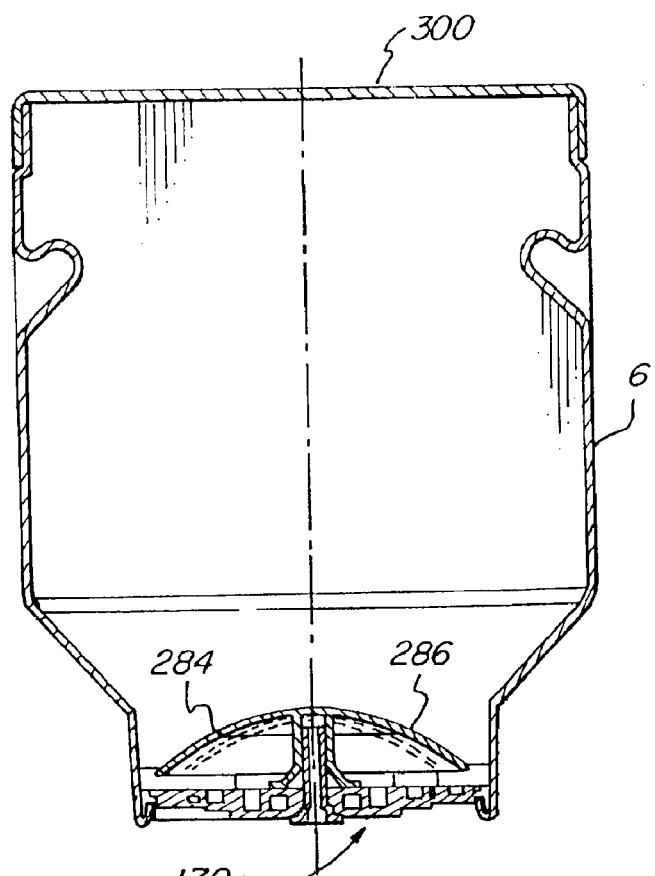

As illustrated by FIGS. 11, 13 and 19, a pair of counter-balanced elements 264 are mounted in the selector drum 262 by axle pivot shafts 266. The rotatable counter-balance elements 264 are oriented at a 45° angle when equilibrium is achieved as illustrated by FIG. 19. When the product container 6 is mounted to the spreader apparatus, the counter-balance elements are rotatable in a horizontal plane. The operator moves lever 244 from the "OFF" position (the lowermost vertical position as shown by FIGS. 11 and 13) to the fully opened position (the highest vertical position as shown by FIGS. 11 and 13) and then back into the "OFF" position. This causes the selector drum 262 to rotate, and the counter-balance elements 264 pass under a raised rib 268 of the selector plate. The counter-balance elements 264 then rotate about the axial pivot shafts 266 for locking the counter-balance elements 264 between the raised ribs 268 of the selector plate. In this manner, the selector plate is guided into and locked into a proper operating position in which vertical movement of the handle 244 between the different stop positions 240 will result in the proper orientation of the selector plate relative to the metering assembly for propelling material from the spreader apparatus in the desired orientation corresponding to the position 240 of the lever 244.

In a further improvement of the spreader apparatus illustrated by FIGS. 11–19, hinged flaps, designated by reference numeral 270, are mounted to the opposed sides of the spreader chassis 272 (See FIGS. 11–14 and 16). The hinged flaps 270 are provided for preventing product from drifting into undesired areas of terrain when an edge application is required. The hinged flaps are removably held in an upright position by suitable means, as for example complementary magnets 274 carried by the hinged flap and magnets 276 mounted to the side of the chassis of the spreader apparatus. When lowered, the hinged flaps 270 pivot about a hinge 278 until magnet 274 carried by the flap is magnetically coupled to magnet 280 carried on a support bracket 282 at a lower elevation on the frame of the chassis than magnet 276. The operator may therefore selectively adjust the position of the flaps between an upright position and a lowered position for controlling the pattern of material dispersed from the rotatable impeller as the spreader apparatus moves along the terrain to be treated. When the hinged flaps are in the upright position, the upper portion of the stream of material propelled from the impeller is blocked. Although the releasable locking means used to maintain the hinged flaps in its upper and lower positions are shown as magnets, other suitable locking means can be appropriately employed.

The meter assembly 170 at the lower discharge outlet of the container 6 includes a spherically or dome shaped partition element 284 (See FIGS. 11–13 and 17–18). This partition is threaded to a portion of a center stem 286. A slot 288 is defined in the partition element 284. The function of the partition element is to prevent the application of the full weight of the product in product container 6 onto the metering assembly 170. The partition element is designed to carry up to 80% of the weight of the product in the product container so that only the weight of the product below the partition element 284 is applied directly to the meter assembly at any given time. The partition element 284, in addition to diffusing the weight of the product in the product container, also serves to dissipate lumps of product into more freely flowing granular material. The partition element 284 is rotatable together with a metering disk 290 to permit product from the product container to flow through the slot 288 to maintain the rate of feed of product through the partition element 284 and onto the metering disc 290. As the partition element 284 rotates relative to the product in the container above the partition element, the rotating slot 288 tends to break up lumps of material into smaller granular material to be metered through the metering assembly and deposited onto the impeller 10. The length of the square on the meter drive shaft 292 is designed to be of sufficient size to accommodate four (4) tapered spiral flutes 294 on the center step 286 for guiding and piloting the square drive meter shaft 292 into the square hole 296. In this manner, the meter assembly 170 carried at the discharge end of the product container 6 is easily coupled to the drive train of the spreader apparatus when the product container 6 is removably mounted to the spreader apparatus.

FIGS. 11 and 17–18 illustrate the product container 6 in position when removably mounted to the spreader apparatus. FIG. 20*b* is an elevational view of the product container removed from the spreader apparatus, and FIG. 20*a* is a bottom plan view of the container illustrated by FIG. 20*b*. The container is formed from a molded plastic and is intended to be refillable and reusable for different treatment applications. The container includes a removable lid 300 at one end and a tapered section 302 at the other end which merges into a cylindrical section 304 (See FIG. 13). When the container is received in its inverted operating position in the hopper as illustrated, for example by FIG. 13, the removable lid 300 is oriented at the top of the inverted container and accessible to the operator for refilling the container with product without removing the container from the hopper. A rolled lip section 306, extending from section 304, supports the metering assembly in the bottom discharge end of the product container (See FIG. 12). A selector disk flange 308 of a selector disk of the meter assembly, rides the outside portion of the lip 306 of the product container, while a flange 310 of the meter disk is supported by the inside of the rolled lip 306 so that the rolled lip 306 is sandwiched between flanges 308 and 310 (See FIG. 12). Accordingly, the meter assembly is supported by the lower portion of the product container 6, but is also prevented from moving upwardly into the product container. The metering disk is removable from the product container so that it is replaceable by a different metering disk, at the selection of the operator, to accommodate the specific requirements (e.g., density, size of granules, moisture content) of the specific product in the container to be metered by the device.

The broadcast spreader described herein is particularly adapted for dispensing agricultural treatment material such as pesticides, herbicides, fungicides, and fertilizer as the apparatus is driven over the terrain to be treated. However, the spreader apparatus in accordance with the present invention is useful for applications of other than agricultural materials, as for example, for spreading salt or other anti-skid or ice-melting granular materials on frozen or icy surfaces, an aquatic spreader for dispersing materials including pesticides on the surface of lakes or other bodies of water, and for industrial uses including dispersing of pellets or other granular materials to be incorporated into an article of manufacture such as a mat. Further applications of the granular spreader disclosed herein will become apparent to those skilled in the art.

Other modifications and advantages of the spreader within the scope of the present invention will become apparent to those skilled in the art. Accordingly, the discussion of the preferred embodiments herein are intended to be illustrative only, and not restrictive of the scope of the invention, that scope being defined by the following claims and all equivalents thereto.

What is claimed is:

1. A product container for dispersing material, said product container comprising:
   a housing and a product meter, said housing including means for retaining said product meter at least partially within said housing;
   wherein said housing defines a tapered section, said tapered section comprising said means for retaining said product meter in said housing;
   said tapered section of said housing defines a discharge outlet, said tapered section of said housing being adapted to retain said product meter over said discharge outlet;
   said tapered section of said housing being defined by a plurality of flaps, said flaps being movable between a retracted position in which said discharge outlet is closed and an extended position in which said discharge outlet is opened.

2. The product container as claimed in claim 1 wherein said product meter is received in its entirety in a storage position within said housing when said discharge opening is closed, and is displaceable relative to said housing over said discharge outlet when said discharge outlet is opened.

3. A product container for dispersing material, said product container comprising:
   a housing and a product meter, said housing including means for retaining said product meter at least partially within said housing;
   a housing and a product meter, said housing including means for retaining said product meter at least partially within said housing;
   wherein said housing is adapted to be received in the hopper of a dispersing apparatus and oriented relative thereto such that said product meter is engageable with drive means associated with said dispersing apparatus when said housing is received in said hopper.

4. A product container comprising:
   an outer housing formed from a substantially rigid material; and
   an inner receptacle for holding product to be dispersed from an apparatus movable along terrain to be treated by said product, said inner receptacle being formed from a substantially flexible material and mounted within said outer housing,
   wherein at least a portion of said outer housing is formed from a plurality of flaps, said flaps being movable between a retracted position in which a discharge outlet of said outer housing is closed, and an extended position in which a discharge outlet of said housing is opened.

5. The product container as claimed in claim 4 wherein said outer housing and inner receptacle are each formed, in part, from a transparent material to permit visual observation of the product in said product container.

6. A container removably mountable to an apparatus for dispersing a product from the container, the container comprising metering means for controlling flow of the product from the container; and means for separating at least a portion of the product in the container from the metering means for reducing the weight of the product applied directly to said metering means.

7. The container as claimed in claim 6 wherein said means for separating includes a partition element disposed in the container and above the metering means.

8. The container as claimed in claim 7 wherein said partition element is rotatable together with the metering means.

9. The container as claimed in claim 8 wherein said partition element includes at least one opening therein for controlling the flow of material through said partition element.

10. The container as claimed in claim 6 wherein said metering means includes guide means for engaging a drive shaft of said apparatus to which said container is mounted.

11. The container as claimed in claim 10 wherein said guide means includes a plurality of spiral flutes defined in the metering means.

12. A product container for dispersing material, said product container comprising:
   a housing and a product meter, said housing including means for retaining said product meter at least partially within said housing;
   wherein said product meter includes a replaceable metering disk.

13. A product container for dispersing material, said product container comprising:
   a housing and a product meter, said housing including means for retaining said product meter at least partially within said housing;
   and an apparatus for dispersing product over terrain to be treated by the dispersed product, said apparatus including:

a housing for said product container;
said product container operatively associated with said housing for holding product to be dispersed by said apparatus over said terrain to be treated;
means operatively associated with said housing for dispersing product from said product container over said terrain to be treated;
means for transporting said housing over said terrain to be treated; and
said product meter comprising a metering assembly received at least partially in said product container and disposed above said means for dispersing said product for controlling the flow of material from said product container onto said means for dispersing said material over said terrain to be treated when said product container is received in said housing;
wherein said means for transporting includes at least one ground engaging wheel for driving said apparatus over said terrain to be treated, said apparatus comprising a drive train coupling said at least one ground engaging wheel to said metering assembly for metering material from said product container onto said dispersing means at a rate proportional to the speed at which said apparatus is driven over said terrain to be treated, said means for dispersing comprising a rotatable impeller disposed beneath said metering assembly for receiving thereon product from said product container, and means coupling said at least one ground engaging wheel to said rotatable impeller for imparting rotational movement to said rotatable impeller as said apparatus is driven over said terrain to be treated.

14. A product container for dispersing material, said product container comprising:
a housing and a product meter, said housing including means for retaining said product meter at least partially within said housing;
and an apparatus for dispersing product over terrain to be treated by the dispersed product, said apparatus including:
a housing for said product container;
said product container operatively associated with said housing for holding product to be dispersed by said apparatus over said terrain to be treated;
means operatively associated with said housing for dispersing product from said product container over said terrain to be treated;
means for transporting said housing over said terrain to be treated; and
said product meter comprising a metering assembly received at least partially in said product container and disposed above said means for dispersing said product for controlling the flow of material from said product container onto said means for dispersing said material over said terrain to be treated when said product container is received in said housing;
wherein said metering assembly in said product container includes means for adjusting the position at which product from said product container is deposited on said means for dispersing.

15. A product container for dispersing material, said product container comprising:
a housing and a product meter, said housing including means for retaining said product meter at least partially within said housing;
and an apparatus for dispersing product over terrain to be treated by the dispersed product, said apparatus including:

a housing for said product container;
said product container operatively associated with said housing for holding product to be dispersed by said apparatus over said terrain to be treated;
means operatively associated with said housing for dispersing product from said product container over said terrain to be treated;
means for transporting said housing over said terrain to be treated; and
said product meter comprising a metering assembly received at least partially in said product container and disposed above said means for dispersing said product for controlling the flow of material from said product container onto said means for dispersing said material over said terrain to be treated when said product container is received in said housing, at least a portion of said metering assembly being removable from said product container.

16. A product container for dispersing material, said product container comprising:
a housing and a product meter, said housing including means for retaining said product meter at least partially within said housing;
and an apparatus for dispersing product over terrain to be treated by the dispersed product, said apparatus including:
a housing for said product container;
said product container operatively associated with said housing for holding product to be dispersed by said apparatus over said terrain to be treated, said product container being removably received within said housing;
means operatively associated with said housing for dispersing product from said product container over said terrain to be treated;
means for transporting said housing over said terrain to be treated; and
said product meter comprising a metering assembly received at least partially in said product container and disposed above said means for dispersing said product for controlling the flow of material from said product container onto said means for dispersing said material over said terrain to be treated when said product container is received in said housing, at least a portion of said metering assembly being removable from said product container.

17. A product container comprising an outer housing formed from a substantially rigid material, and an inner receptacle for holding product to be dispersed from an apparatus movable along terrain to be treated by said product, said inner receptacle being formed from a substantially flexible material and mounted within said outer housing; in combination with an apparatus including:
a housing for said product container;
said product container operatively associated with said housing for holding product to be dispersed by said apparatus over said terrain to be treated;
means operatively associated with said housing for dispersing product from said product container over said terrain to be treated;
means for transporting said housing over said terrain to be treated; and
a metering assembly received at least partially in said product container and disposed above said means for dispersing said product for controlling the flow of material from said product container onto said means for dispersing said material over said terrain to be treated when said product container is received in said housing;

wherein said means for transporting includes at least one ground engaging wheel for driving said apparatus over said terrain to be treated, said apparatus comprising a drive train coupling said at least one ground engaging wheel to said metering assembly for metering material from said product container onto said dispersing means at a rate proportional to the speed at which said apparatus is driven over said terrain to be treated, said means for dispersing comprising a rotatable impeller disposed beneath said metering assembly for receiving thereon product from said product container, and means coupling said at least one ground engaging wheel to said rotatable impeller for imparting rotational movement to said rotatable impeller as said apparatus is driven over said terrain to be treated.

18. A product container comprising an outer housing formed from a substantially rigid material, and an inner receptacle for holding product to be dispersed from an apparatus movable along terrain to be treated by said product, said inner receptacle being formed from a substantially flexible material and mounted within said outer housing; in combination with an apparatus for dispersing product over terrain to be treated by the dispersed product, said apparatus including:

a housing for said product container;

said product container operatively associated with said housing for holding product to be dispersed by said apparatus over said terrain to be treated;

means operatively associated with said housing for dispersing product from said product container over said terrain to be treated;

means for transporting said housing over said terrain to be treated; and a metering assembly received at least partially in said product container and disposed above said means for dispersing said product for controlling the flow of material from said product container onto said means for dispersing said material over said terrain to be treated when said product container is received in said housing;

wherein said metering assembly in said product container includes means for adjusting the position at which product from said product container is deposited on said means for dispersing.

19. A product container comprising an outer housing formed from a substantially rigid material, and an inner receptacle for holding product to be dispersed from an apparatus movable along terrain to be treated by said product, said inner receptacle being formed from a substantially flexible material and mounted within said outer housing; in combination with an apparatus for dispersing product over terrain to be treated by the dispersed product, said apparatus including:

a housing for said product container;

said product container operatively associated with said housing for holding product to be dispersed by said apparatus over said terrain to be treated;

means operatively associated with said housing for dispersing product from said product container over said terrain to be treated;

means for transporting said housing over said terrain to be treated; and a metering assembly received at least partially in said product container and disposed above said means for dispersing said product for controlling the flow of material from said product container onto said means for dispersing said material over said terrain to be treated when said product container is received in said housing, at least a portion of said metering assembly being removable from said product container.

20. A product container comprising an outer housing formed from a substantially rigid material, and an inner receptacle for holding product to be dispersed from an apparatus movable along terrain to be treated by said product said inner receptacle being formed from a substantially flexible material and mounted within said outer housing; in combination with an apparatus for dispersing product over terrain to be treated by the dispersed product, said apparatus including:

a housing for said product container;

said product container operatively associated with said housing for holding product to be dispersed by said apparatus over said terrain to be treated, said product container being removably received within said housing;

means operatively associated with said housing for dispersing product from said product container over said terrain to be treated;

means for transporting said housing over said terrain to be treated; and a metering assembly received at least partially in said product container and disposed above said means for dispersing said product for controlling the flow of material from said product container onto said means for dispersing said material over said terrain to be treated when said product container is received in said housing, at least a portion of said metering assembly being removable from said product container.

21. The product container as claimed in claim 6 in combination with an apparatus for dispersing product over terrain to be treated by the dispersed product, said apparatus including:

a housing for said product container;

said product container operatively associated with said housing for holding product to be dispersed over said terrain to be treated;

rotatable means operatively associated with said housing for dispersing product from said product container over said terrain to be treated, and means for controlling the rotational speed of said rotatable means such that said rotatable means rotate at a predetermined substantially constant rotational speed independent of the linear speed at which said apparatus is driven over said terrain to be treated; and means for transporting said housing over said terrain to be treated, said means for transporting comprising at least one ground engaging wheel for driving said apparatus over said terrain to be treated, and a drive train coupling said at least one ground engaging wheel to said metering means for metering material from said product container onto said rotatable means at a rate substantially proportional to said linear speed at which said apparatus is driven over said terrain to be treated.

22. The product container as claimed in claim 6 in combination with an apparatus for dispersing product, the apparatus comprising:

a housing;

said product container operatively associated with said housing for holding a product;

means for dispersing the product from the product container;

said metering means adapted for controlling the flow of the product between the product container and the means for dispersing; and means for transporting the housing over a terrain;

said metering means including selector means for adjusting the position on which product is deposited on said means for dispersing, and switch means for controlling the position of said selector means relative to said metering means.

23. The product container as claimed in claim 6 in combination with an apparatus for dispersing product, the apparatus comprising:

a housing;

said product container operatively associated with the housing for holding a product;

means for dispersing the product from the product container;

said metering means adapted for controlling the flow of the product between the product container and the means for dispersing;

means for transporting the housing over a terrain; and a drive train coupling said means for transporting to said means for dispersing for rotating said means for dispersing as said apparatus moves along the terrain, said drive train including an override clutch for permitting said means for dispersing to continue to rotate after movement of said apparatus has stopped.

24. The product container as claimed in claim 6 in combination with a device for dispersing material over terrain to be treated, said device including:

means for transporting said product container holding said material to be applied by said device to said terrain to be treated;

means for dispersing said material from said device as said device is transported over said terrain to be treated;

said metering means adapted for controlling the deposit of said material from said product container onto said means for dispersing;

a drive train coupling at least one ground engaging wheel of said means for transporting to said metering means for imparting rotatable movement to said metering means for depositing said material from said product container onto said means for dispersing when said device is moved along said terrain in a first predetermined direction;

said drive train comprising drive means, driven means, and means for engaging said drive means and said driven means to impart rotatable movement from said drive means to said driven means only when said device is moved along said terrain in said first predetermined direction.

25. The product container as claimed in claim 6 in combination with an apparatus for dispersing product, the apparatus comprising:

a housing;

said product container operatively associated with the housing for holding a product;

means for dispersing the product from the product container;

said metering means adapted for controlling the flow of the product between the product container and the means for dispersing;

means for transporting the housing over a terrain; and means for selectively controlling the distribution of product from said apparatus by said means of dispersing, said means for controlling being oriented relative to said means for dispersing such that it acts on said product only after said product has been dispersed from said means for dispersing.

26. The product container as claimed in claim 6 in combination with an apparatus for dispersing product, the apparatus comprising:

a housing;

said product container operatively associated with the housing for holding a product;

means for dispersing the product from the product container;

said metering means adapted for controlling the flow of the product between the product container and the means for dispersing;

means for transporting the housing over a terrain; and a drive train coupling said means for transporting with said means for dispersing, said means for transporting including at least one wheel rotatable over the terrain, said drive train including a clutch proximate to the inner surface of said at least one wheel, said clutch including means for reflecting sound waves generated by said clutch in a direction towards said inner surface of said at least one wheel for reducing noise as said apparatus is transported over the terrain.

27. The product container as claimed in claim 6 in combination with an apparatus for dispersing product, the apparatus comprising:

a housing;

said product container operatively associated with the housing for holding a product;

means for dispersing the product from the product container;

said metering means adapted for controlling the flow of the product between the product container and the means for dispersing;

means for transporting the housing over a terrain; and means operatively associated with said means for dispersing for selectively varying the rotational speed of said means for dispersing between at least a first predetermined rotational speed and a second predetermined rotational speed.

* * * * *

UNITED STATES PATENT AND TRADEMARK OFFICE
CERTIFICATE OF CORRECTION

PATENT NO. : 6,851,634 B2  Page 1 of 1
APPLICATION NO. : 10/430080
DATED : February 8, 2005
INVENTOR(S) : Keith F. Woodruff et al.

It is certified that error appears in the above-identified patent and that said Letters Patent is hereby corrected as shown below:

Col. 6, Line 59: Before "The top end 30", Add --Preferably, the container housing 24 is formed from a substantially rigid material, and the product bag 25 is formed from a substantially flexible material.--

Claim 3, Lines 3 - 5 (Col. 20, Lines 1 - 3): Delete "a housing and a product meter, said housing including means for retaining said product meter at least partially within said housing;"

Claim 25, Line 14 (Col. 26, Line 14): Delete "means of dispersing", and Substitute --means for dispersing--.

Claim 26, Line 19 (Col. 26, Line 37): Delete "surf ace", and Substitute --surface--.

Signed and Sealed this

Twenty-fifth Day of December, 2007

JON W. DUDAS
*Director of the United States Patent and Trademark Office*